United States Patent
Wong et al.

(10) Patent No.: US 11,171,820 B2
(45) Date of Patent: Nov. 9, 2021

(54) TERMINAL DEVICE, INFRASTRUCTURE EQUIPMENT AND METHODS

(71) Applicant: Convida Wireless, LLC, Wilmington, DE (US)

(72) Inventors: Shin Horng Wong, Basingstoke (GB); Martin Warwick Beale, Basingstoke (GB)

(73) Assignee: Convida Wireless, LLC, Wilmington, DE (US)

( * ) Notice: Subject to any disclaimer, the term of this patent is extended or adjusted under 35 U.S.C. 154(b) by 37 days.

(21) Appl. No.: 16/491,159

(22) PCT Filed: Mar. 22, 2018

(86) PCT No.: PCT/EP2018/057368
§ 371 (c)(1),
(2) Date: Sep. 5, 2019

(87) PCT Pub. No.: WO2018/172486
PCT Pub. Date: Sep. 27, 2018

(65) Prior Publication Data
US 2020/0014572 A1     Jan. 9, 2020

(30) Foreign Application Priority Data

Mar. 23, 2017   (EP) .................................... 17162668

(51) Int. Cl.
*H04L 27/26*     (2006.01)
*H04L 1/16*      (2006.01)
(Continued)

(52) U.S. Cl.
CPC ........ *H04L 27/2657* (2013.01); *H04L 1/1657* (2013.01); *H04L 1/1671* (2013.01);
(Continued)

(58) Field of Classification Search
None
See application file for complete search history.

(56) References Cited

U.S. PATENT DOCUMENTS 6,522,650 B1 *  2/2003  Yonge, III ............ H04L 1/0057
                                                         370/390
6,721,564 B1 *  4/2004  Kobayashi ............ H04W 36/30
                                                         455/436
(Continued)

FOREIGN PATENT DOCUMENTS

WO    2016/154899 A1    10/2016
WO    2017/157480 A1     9/2017

OTHER PUBLICATIONS

3GPP TSG RAN WG1 Meeting #82bis, Sony, "Considerations on Measurement Gaps for LC-MTC," Malmo, Sweden, Oct. 5-9, 2015.*

(Continued)

*Primary Examiner* — Andrew C Oh
(74) *Attorney, Agent, or Firm* — BakerHostetler

(57) ABSTRACT

A terminal device comprises a transmitter, a receiver and a controller. The transmitter is configured to transmit a first radio signal to infrastructure equipment of a wireless telecommunications system, the first radio signal being repeatedly transmitted a predetermined number of times during each of a plurality of consecutive time periods, each of the consecutive time periods being separated by a separation time period. The receiver is configured to receive, from the infrastructure equipment during one of the separation time periods, a second radio signal that comprises an indicator indicating that transmission of the first radio signal should continue or that transmission of the first radio signal should be terminated and the second radio signal having a measurable characteristic on the basis of which the terminal device (Continued)

reduces an offset of a reference radio frequency of the terminal device relative to a transmission radio frequency of the infrastructure equipment.

21 Claims, 9 Drawing Sheets

(51) Int. Cl.
*H04L 1/18* (2006.01)
*H04L 1/20* (2006.01)
*H04W 56/00* (2009.01)
*H04W 72/04* (2009.01)

(52) U.S. Cl.
CPC .............. *H04L 1/189* (2013.01); *H04L 1/20* (2013.01); *H04W 56/0035* (2013.01); *H04W 72/0406* (2013.01); *H04W 72/0453* (2013.01)

(56) References Cited

U.S. PATENT DOCUMENTS

| | | | |
|---|---|---|---|
| 2003/0235202 A1* | 12/2003 | Van Der Zee | H04L 47/564 370/428 |
| 2007/0019589 A1* | 1/2007 | Attar | H04W 52/50 370/335 |
| 2008/0165675 A1* | 7/2008 | Yang | H04L 27/2647 370/210 |
| 2008/0293424 A1* | 11/2008 | Cho | H04L 5/0023 455/450 |
| 2010/0103901 A1* | 4/2010 | Miki | H04W 88/08 370/330 |
| 2010/0128648 A1* | 5/2010 | Lee | H04W 74/0866 370/312 |
| 2013/0136053 A1* | 5/2013 | Kim | H04L 5/0044 370/312 |
| 2013/0301569 A1 | 11/2013 | Wang et al. | |
| 2014/0328312 A1* | 11/2014 | Seo | H04L 1/16 370/329 |
| 2015/0181546 A1* | 6/2015 | Freda | H04L 27/0014 370/336 |
| 2015/0189613 A1* | 7/2015 | Chen | H04W 52/0212 370/311 |
| 2015/0223237 A1* | 8/2015 | Sambhwani | H04L 5/0055 370/336 |
| 2015/0257106 A1* | 9/2015 | Mujtaba | H04W 52/0238 370/311 |
| 2015/0341131 A1* | 11/2015 | Sano | H04B 7/024 370/329 |
| 2016/0226649 A1* | 8/2016 | Papasakellariou | H04L 1/0001 |
| 2016/0269939 A1* | 9/2016 | Papasakellariou | H04L 1/00 |
| 2016/0286555 A1* | 9/2016 | Papasakellariou | H04L 5/0053 |
| 2016/0337157 A1* | 11/2016 | Papasakellariou | H04L 5/0016 |
| 2016/0353398 A1* | 12/2016 | de Ruijter | H04W 56/001 |
| 2017/0118762 A1* | 4/2017 | Learned | H04W 28/18 |
| 2017/0135052 A1* | 5/2017 | Lei | H04L 5/0048 |
| 2017/0181011 A1* | 6/2017 | Yu | H04W 52/04 |
| 2017/0188391 A1* | 6/2017 | Rajagopal | H04W 74/0816 |
| 2017/0202008 A1* | 7/2017 | Nader | H04L 1/1896 |
| 2017/0289966 A1* | 10/2017 | Islam | H04L 5/0044 |
| 2017/0290015 A1* | 10/2017 | Xu | H04W 72/0453 |
| 2017/0303248 A1* | 10/2017 | Chatterjee | H04L 1/1861 |
| 2017/0317816 A1* | 11/2017 | Lei | H04W 48/16 |
| 2017/0373735 A1* | 12/2017 | Kim | H04L 5/0051 |
| 2018/0145819 A1* | 5/2018 | Axmon | H04W 4/70 |
| 2018/0167915 A1* | 6/2018 | Lee | H04W 12/041 |
| 2018/0192354 A1* | 7/2018 | Yi | H04L 5/0094 |
| 2018/0213425 A1* | 7/2018 | Huang | H04W 76/20 |
| 2018/0227958 A1* | 8/2018 | Xiong | H04W 74/0833 |
| 2018/0242287 A1* | 8/2018 | Chae | H04W 4/40 |
| 2018/0295007 A1* | 10/2018 | Kumar | H04L 27/2613 |
| 2018/0309544 A1* | 10/2018 | Hwang | H04L 1/1887 |
| 2018/0376405 A1* | 12/2018 | Han | H04J 13/0062 |
| 2019/0082412 A1* | 3/2019 | Zander | H04W 74/0833 |
| 2019/0090092 A1* | 3/2019 | Hwang | G01S 5/0205 |
| 2020/0260527 A1* | 8/2020 | Xiong | H04L 5/0073 |

OTHER PUBLICATIONS

International Search Report and Written Opinion dated Jun. 20, 2018 for PCT/EP2018/057368 filed on Mar. 22, 2018, 10 pages.
Sony, "Considerations on Measurement Gaps for LC-MTC", 3GPP TSG RAN WG1 Meeting #82bis R1-155882, Malmö Sweden, Oct. 5 -9, 2015, 3 pages.
Mediatek Inc., "Discussion on UE Power Consumption Reduction Techniques", 3GPP TSG-RAN WG1 Meeting No. 81 R1-153338, Fukuoka, Japan, May 25-29, 2015, pp. 1-5.
Ericsson, "Revised WID for Further Enhanced MTC for LTE", 3GPP TSG RAN Meeting No. 73, RP-161464 revision of RP-161321, New Orleans, USA, Sep. 19-22, 2016, 6 pages.
Huawei et al., "Revised work item proposal: Enhancements of NB-IoT", 3GPP TSG RAN Meeting No. 73, RP-161901 revision of RP-161324, New Orleans, USA, Sep. 19-22, 2016, 7 pages.
Holma et al. , "LTE for UMTS OFDMA and SC-FDMA Based Radio Access", System Architecture Based on 3GPP SAE, Wiley 2009, pp. 25-27.

* cited by examiner

TERMINAL DEVICE, INFRASTRUCTURE EQUIPMENT AND METHODS

CROSS-REFERENCE TO RELATED APPLICATIONS

The present application is based on PCT filing PCT/EP2018/057368, filed Mar. 22, 2018, which claims priority to EP 17162668.2, filed Mar. 23, 2017, the entire contents of each are incorporated herein by reference.

TECHNICAL FIELD OF THE DISCLOSURE

The present disclosure relates to a terminal device, infrastructure equipment and methods.

BACKGROUND OF THE DISCLOSURE

Mobile communications system (or wireless telecommunications system) such as those which are being developed in accordance with the Long Term Evolution (LTE) project by the Third Generation Project Partnership (3GPP) can provide a facility for communications devices to transmit or receive data for a variety of applications with high data rates within a radio coverage area provided by a mobile communications network. A wireless access interface provided by the mobile communications network configured in accordance with an LTE standard includes signal transmission techniques which can support these high data rates. There is therefore expected to be a variety of applications, which can be supported by an LTE system.

Although there are applications which require high data rates to support their operation, there are some applications in which high data rates are not required. Indeed there are some applications which are expected to be provided by more simple, less complicated communications devices such as those supporting machine type communications (MTC). Such devices are also expected to be low power devices and may include a relatively inexpensive low complexity, narrowband, transmitter and receiver. Such devices may also be deployed in locations in which radio communications conditions can make transmission and reception of signals more difficult.

A technique which has been proposed to improve a likelihood of communications devices to successfully transmit signals to or receive signals from a mobile communications network using an existing transmission format is to repeat a transmission of a signal representing a message to or from a communications device. A receiver of the mobile telecommunications network or communications device can combine the repeatedly received message to improve a likelihood of correctly detecting the message. Therefore, a mobile communications network can be arranged to extend its radio coverage, particularly for less complicated mobile communications devices. Such a technique is known as coverage extension (or coverage enhancement).

However, the use of repeated message transmission so as to allow such coverage extension for narrowband transmitters and receivers may be problematic. The present technique aims to alleviate these problems.

SUMMARY OF THE DISCLOSURE

The present disclosure provides a terminal device for use in a wireless telecommunications system, the terminal device comprising: a transmitter configured to transmit a first radio signal to infrastructure equipment of the wireless telecommunications system, the first radio signal being repeatedly transmitted a predetermined number of times during each of a plurality of consecutive time periods, each of the plurality of consecutive time periods being separated by a separation time period; a receiver configured to receive, from the infrastructure equipment and during one of the separation time periods, a second radio signal, the second radio signal comprising an indicator indicating that transmission of the first radio signal to the infrastructure equipment should continue or that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment; and a controller configured, on the basis of the received second radio signal, to control the transmitter to continue or to terminate transmission of the first radio signal and to reduce an offset of the reference radio frequency of the terminal device relative to the transmission radio frequency of the infrastructure equipment.

In an embodiment, the indicator of the second radio signal comprises one of a first data sequence indicating that transmission of the first radio signal should continue and a second data sequence indicating that transmission of the second radio signal should be terminated.

In an embodiment, the terminal device comprises a storage medium configured to store information indicative of each of the first and second data sequences, wherein the controller is configured: to determine a metric for each of the first and second data sequences, the metric indicating an extent of correlation of the one of the first and second data sequences comprised within the second radio signal with each of the first and second data sequences information indicative of which is stored, and to determine the one of the first and second data sequences comprised within the second radio signal and an offset of the reference radio frequency of the terminal device relative to the transmission radio frequency of the infrastructure equipment based on the metric indicating the greatest extent of correlation.

In an embodiment, the one of the first and second data sequences is one of a plurality of predetermined data sequences; and the receiver is configured to receive control information from the infrastructure equipment indicating the one of the plurality of predetermined data sequences that is to be used as the one of the first and second data sequences.

In an embodiment, the control information is downlink control information (DCI) allocating radio resources for a physical uplink shared channel (PUSCH).

In an embodiment, the control information is comprised within radio resource control (RRC) signalling.

In an embodiment, the indicator of the second radio signal comprises one of a first bit value indicating that transmission of the first radio signal to the infrastructure equipment should continue and a second bit value indicating that transmission of the first radio signal to the infrastructure equipment should be terminated.

In an embodiment, the receiver is configured to receive control information from the infrastructure equipment, the control information indicating a portion of the second radio signal within which the indicator of the second radio signal is located; and the controller is configured to obtain the indicator from the portion of the second radio signal indicated by the control information.

In an embodiment, the control information is downlink control information (DCI) allocating radio resources for a physical uplink shared channel (PUSCH); and the indicator of the second radio signal is comprised within further downlink control information (DCI).

In an embodiment, the control information is comprised within radio resource control (RRC) signalling; and the indicator of the second radio signal is comprised within downlink control information (DCI).

In an embodiment, the second radio signal is transmitted using radio resources in a frequency band used for transmitting a synchronisation signal to the terminal device.

In an embodiment, the second radio signal is transmitted over a time period starting at a first time; a portion of the second radio signal comprising the indicator is transmitted over a time period starting at a second time, the second time being later than the first time; and a portion of the second radio signal transmitted over the time period defined between the first time and the second time comprises the measurable characteristic on the basis of which the terminal device is operable to reduce an offset of the reference radio frequency of the terminal device relative to the transmission radio frequency of the infrastructure equipment.

In an embodiment, the measurable characteristic of the second radio signal is measurable by each of a plurality of terminal devices; and the indicator of the second radio signal is associated with the terminal device only.

In an embodiment, the portion of the second radio signal transmitted over the time period defined between the first time and the second time comprises a common data sequence associated with the plurality of terminal devices, the measurable characteristic being measurable based on the common data sequence; and the portion of the second radio signal transmitted after the second time comprises a specific data sequence associated with the terminal device only.

In an embodiment, the second radio signal comprises a first portion transmitted over a time period defined between a first time and a second, later, time, a second portion defined between the second time and a third, later, time and a third portion defined between the third time and a fourth, later, time; each of the first and third portions of the second radio signal comprises the measurable characteristic on the basis of which the terminal device is operable to reduce an offset of the reference radio frequency of the terminal device relative to the transmission radio frequency of the infrastructure equipment; and the second portion comprises the indicator of the second radio signal.

In an embodiment, the second radio signal is received from the infrastructure equipment in a beamformed manner.

In an embodiment, the one of the separation time periods during which the second radio signal is received occurs after a predetermined number of previous ones of the separation time periods during each of which the second radio signal is not transmitted.

In an embodiment, the indicator of the second radio signal indicates that transmission of the first radio signal to the infrastructure equipment is to be terminated after a predetermined number of further transmissions of the first radio signal; and the controller is configured to control the transmitter to terminate transmission of the first radio signal to the infrastructure equipment after the predetermined number of further transmissions of the first radio signal have been completed.

In an embodiment, in response to the controller determining that the receiver has received a second radio signal comprising an indicator indicating that transmission of the first radio signal to the infrastructure equipment should be terminated, the controller is configured: to determine whether the receiver receives a subsequent radio signal comprising a further indicator indicating that transmission of the first radio signal to the infrastructure equipment should be terminated; and if it is determined that a subsequent radio signal comprising a further indicator indicating that transmission of the first radio signal to the infrastructure equipment should be terminated is received, to control the transmitter to terminate transmission of the first radio signal to the infrastructure equipment, and if it is determined that a subsequent radio signal comprising a further indicator indicating that transmission of the first radio signal to the infrastructure equipment should be terminated is not received, to control the transmitter to continue transmission of the first radio signal to the infrastructure equipment.

The present disclosure provides infrastructure equipment for use in a wireless telecommunications system, the infrastructure equipment comprising: a receiver configured to repeatedly receive a first radio signal from a terminal device of the wireless telecommunications system, the first radio signal being repeatedly transmitted by the terminal device a predetermined number of times during each of a plurality of consecutive time periods, each of the plurality of consecutive time periods being separated by a separation time period; a controller configured to determine whether information comprised within the first radio signal has been successfully obtained; and a transmitter configured to transmit to the terminal device, in response to the information comprised within the first radio signal being determined to have been successfully obtained and during one of the separation time periods, a second radio signal, the second radio signal comprising an indicator indicating transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment.

In an embodiment, in response to the information comprised within the first radio signal not being determined to have been successfully obtained and during one of the separation time periods, the transmitter is configured to transmit the second radio signal to the terminal device, the second radio signal comprising an indicator indicating that transmission of the first radio signal to the infrastructure equipment should continue and the second radio signal having a measurable characteristic on the basis of which the terminal device is operable to reduce an offset of a reference radio frequency of the terminal device relative to a transmission radio frequency of the infrastructure equipment.

In an embodiment, the indicator of the second radio signal comprises one of a first data sequence indicating that transmission of the first radio signal should continue and a second data sequence indicating that transmission of the second radio signal should be terminated.

In an embodiment, the terminal device is configured to determine a metric for each of the first and second data sequences, the metric indicating an extent of correlation of the one of the first and second data sequences comprised within the second radio signal with each of first and second data sequences information indicative of which is stored in a storage medium of the terminal device, and to determine the one of the first and second data sequences comprised within the second radio signal and an offset of the reference radio frequency of the terminal device relative to the transmission radio frequency of the infrastructure equipment based on the metric indicating the greatest extent of correlation.

In an embodiment, the one of the first and second data sequences is one of a plurality of predetermined data sequences; and the transmitter is configured to transmit control information to the terminal device indicating the one of the plurality of predetermined data sequences that is to be used as the one of the first and second data sequences.

In an embodiment, the control information is downlink control information (DCI) allocating radio resources for a physical uplink shared channel (PUSCH).

In an embodiment, the control information is comprised within radio resource control (RRC) signalling.

In an embodiment, the indicator of the second radio signal comprises one of a first bit value indicating that transmission of the first radio signal to the infrastructure equipment should continue and a second bit value indicating that transmission of the first radio signal to the infrastructure equipment should be terminated.

In an embodiment, the transmitter is configured to transmit control information to the terminal device, the control information indicating a portion of the second radio signal within which the indicator of the second radio signal is located; and the controller is configured to control the transmitter to locate the indicator at the portion of the second radio signal indicated by the control information.

In an embodiment, the control information is downlink control information (DCI) allocating radio resources for a physical uplink shared channel (PUSCH); and the indicator of the second radio signal is comprised within further downlink control information (DCI).

In an embodiment, the control information is comprised within radio resource control (RRC) signalling; and the indicator of the second radio signal is comprised within downlink control information (DCI).

In an embodiment, the second radio signal is transmitted using radio resources in a frequency band used for transmitting a synchronisation signal to the terminal device.

In an embodiment, the second radio signal is transmitted over a time period starting at a first time; a portion of the second radio signal comprising the indicator is transmitted over a time period starting at a second time, the second time being later than the first time; and a portion of the second radio signal transmitted over the time period defined between the first time and the second time comprises the measurable characteristic on the basis of which the terminal device is operable to reduce an offset of the reference radio frequency of the terminal device relative to the transmission radio frequency of the infrastructure equipment.

In an embodiment, the measurable characteristic of the second radio signal is measurable by each of a plurality of terminal devices; and the indicator of the second radio signal is associated with a single terminal device only.

In an embodiment, the portion of the second radio signal transmitted over the time period defined between the first time and the second time comprises a common data sequence associated with the plurality of terminal devices, the measurable characteristic being measurable based on the common data sequence; and the portion of the second radio signal transmitted after the second time comprises a specific data sequence associated with the single terminal device only.

In an embodiment, the second radio signal comprises a first portion transmitted over a time period defined between a first time and a second, later, time, a second portion defined between the second time and a third, later, time and a third portion defined between the third time and a fourth, later, time; each of the first and third portions of the second radio signal comprises the measurable characteristic on the basis of which the terminal device is operable to reduce an offset of the reference radio frequency of the terminal device relative to the transmission radio frequency of the infrastructure equipment; and the second portion comprises the indicator of the second radio signal.

In an embodiment, the second radio signal is transmitted to the terminal device in a beamformed manner.

In an embodiment, the one of the separation time periods during which the second radio signal is transmitted occurs after a predetermined number of previous ones of the separation time periods during each of which the second radio signal is not transmitted.

In an embodiment, the indicator of the second radio signal indicates that transmission of the first radio signal to the infrastructure equipment is to be terminated after a predetermined number of further transmissions of the first radio signal, the terminal device being configured to terminate transmission of the first radio signal to the infrastructure equipment after the predetermined number of further transmissions of the first radio signal have been completed.

In an embodiment, the transmitter is configured, at a time after a transmission of a second radio signal comprising an indicator indicating that transmission of the first radio signal to the infrastructure equipment should be terminated, to transmit to the terminal device a subsequent radio signal comprising a further indicator indicating that transmission of the first radio signal to the infrastructure equipment should be terminated.

In an embodiment, in response to the controller determining that the receiver is no longer receiving expected repetitions of the first radio signal and that the transmitter has not transmitted a second radio signal comprising an indicator indicating that transmission of the first radio signal to the infrastructure equipment should be terminated, the transmitter is configured to transmit to the terminal device a further radio signal comprising an indicator indicating that transmission of the first radio signal to the infrastructure equipment should continue.

The present disclosure provides a method of operating terminal device for use in a wireless telecommunications system, the method comprising: controlling a transmitter of the terminal device to transmit a first radio signal to infrastructure equipment of the wireless telecommunications system, the first radio signal being repeatedly transmitted a predetermined number of times during each of a plurality of consecutive time periods, each of the plurality of consecutive time periods being separated by a separation time period; controlling a receiver of the terminal device to receive, from the infrastructure equipment and during one of the separation time periods, a second radio signal, the second radio signal comprising an indicator indicating that transmission of the first radio signal to the infrastructure equipment should continue or that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment; and on the basis of the received second radio signal, controlling the transmitter of the terminal device to continue or to terminate transmission of the first radio signal and to reduce an offset of the reference radio frequency of the terminal device relative to the transmission radio frequency of the infrastructure equipment.

The present disclosure provides infrastructure equipment for use in a wireless telecommunications system, the method comprising: controlling a receiver of the infrastructure equipment to repeatedly receive a first radio signal from a terminal device of the wireless telecommunications system, the first radio signal being repeatedly transmitted by the terminal device a predetermined number of times during each of a plurality of consecutive time periods, each of the plurality of consecutive time periods being separated by a separation time period; determining whether information comprised within the first radio signal has been successfully obtained; and controlling a transmitter of the infrastructure equipment to transmit to the terminal device, in response to the information comprised within the first radio signal being determined to have been successfully obtained and during one of the separation time periods, a second radio signal, the second radio signal comprising an indicator indicating that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment.

The present disclosure provides a wireless telecommunications system comprising the above-mentioned terminal device and the above-mentioned infrastructure equipment.

The present disclosure provides circuitry for a terminal device for use in a wireless telecommunications system, wherein the circuitry comprises controller circuitry, transmitter circuitry and receiver circuitry, the controller circuitry being configured: to control the transmitter circuitry to transmit a first radio signal to infrastructure equipment of the wireless telecommunications system, the first radio signal being repeatedly transmitted a predetermined number of times during each of a plurality of consecutive time periods, each of the plurality of consecutive time periods being separated by a separation time period; to control the receiver circuitry to receive, from the infrastructure equipment and during one of the separation time periods, a second radio signal, the second radio signal comprising an indicator indicating that transmission of the first radio signal to the infrastructure equipment should continue or that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment; and on the basis of the received second radio signal, to control the transmitter circuitry to continue or to terminate transmission of the first radio signal and to reduce an offset of the reference radio frequency of the terminal device relative to the transmission radio frequency of the infrastructure equipment.

The present disclosure provides circuitry for infrastructure equipment for use in a wireless telecommunications system, wherein the circuitry comprises controller circuitry, transmitter circuitry and receiver circuitry, wherein the controller circuitry is configured: to control the receiver circuitry to repeatedly receive a first radio signal from a terminal device of the wireless telecommunications system, the first radio signal being repeatedly transmitted by the terminal device a predetermined number of times during each of a plurality of consecutive time periods, each of the plurality of consecutive time periods being separated by a separation time period; to determine whether information comprised within the first radio signal has been successfully obtained; and to control the transmitter circuitry to transmit to the terminal device, in response to the information comprised within the first radio signal being determined to have been successfully obtained and during one of the separation time periods, a second radio signal, the second radio signal comprising an indicator indicating that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment.

Various further aspects and features of the present disclosure are defined in the appended claims.

BRIEF DESCRIPTION OF DRAWINGS

Embodiments of the present disclosure will now be described by way of example only with reference to the accompanying drawings wherein like parts are provided with the same reference numerals and in which.

DESCRIPTION OF EXAMPLE EMBODIMENTS

Communications System

Figure 1:
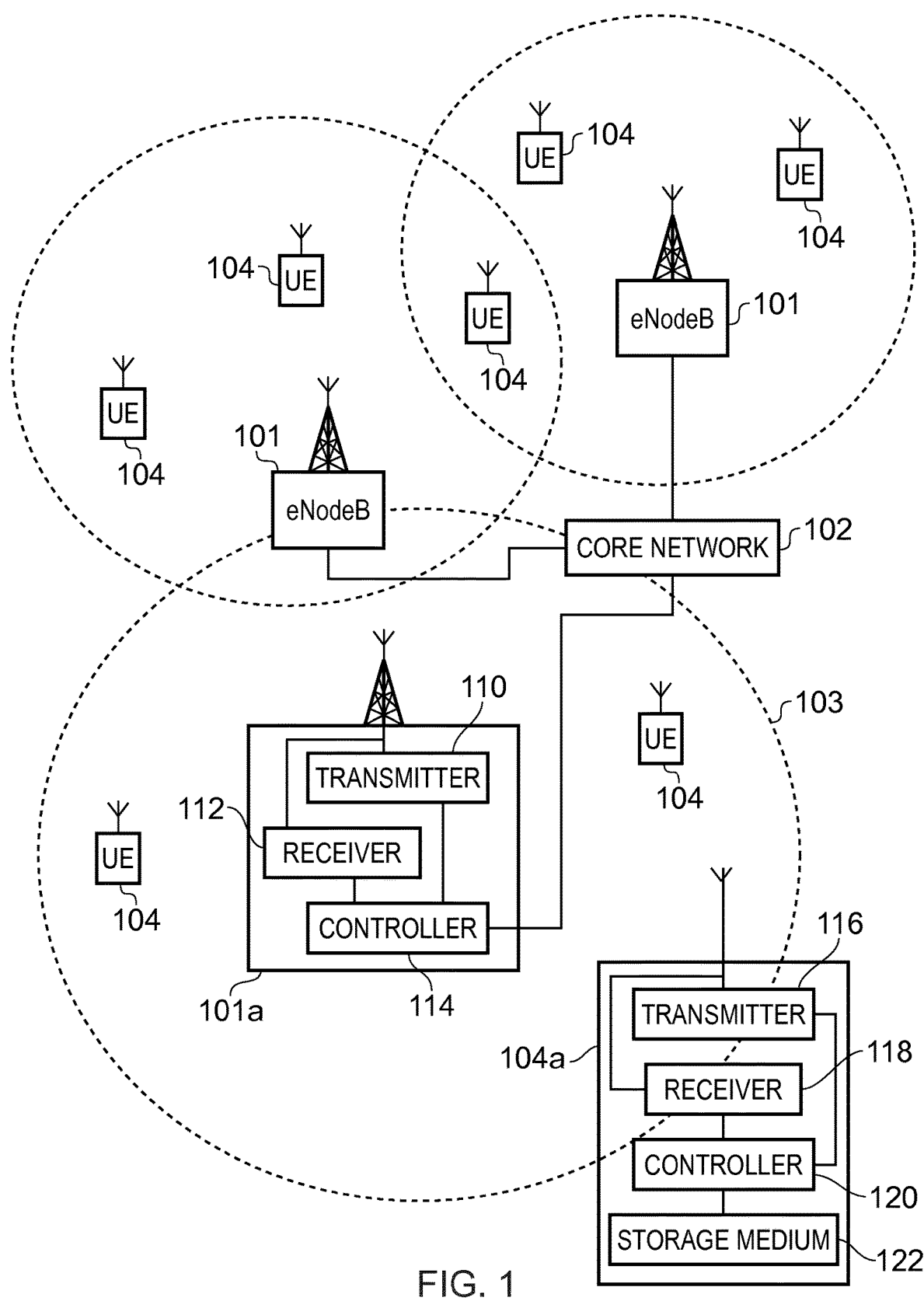
FIG. 1 provides a schematic block diagram of a mobile communications system in which communications devices are communicating via infrastructure equipment.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, infrastructure apparatus, enhanced Node B (eNodeB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) standard.

As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

Figure 2:
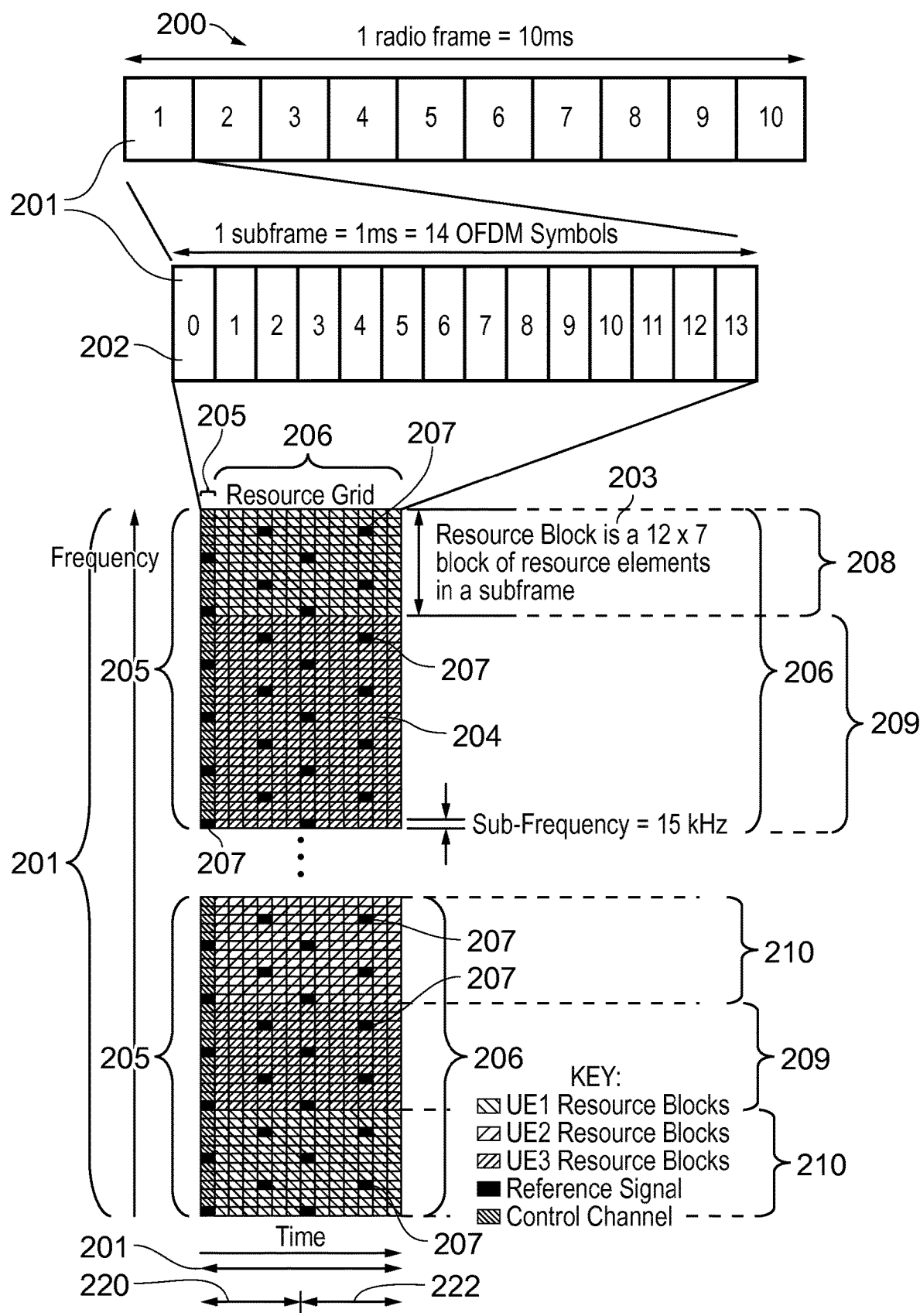
FIG. 2 provides a schematic diagram of a structure of a downlink of a wireless access interface of a mobile communications system operating according to an LTE standard.

In this example, the infrastructure equipment 101a comprises a transmitter 110 for transmission of wireless signals, a receiver 112 for reception of wireless signals and a controller 114 configured to control infrastructure equipment 1001a to operate in accordance with embodiments of the present disclosure as described herein. The controller 114 may comprise various sub-units, such as a scheduler, for providing functionality in accordance with embodiments of the present disclosure as explained further below. These sub-units may be implemented as discrete hardware elements or as appropriately configured functions of the controller 114. Thus, the controller 114 may comprise a processor which is suitably configured/programmed to provide the desired functionality described herein using conventional programming/configuration techniques for equipment in wireless telecommunications systems. The transmitter 110, receiver 112 and controller 114 are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the infrastructure equipment 101a will in general comprise various other elements associated with its operating functionality, such as a scheduler. For example, although not shown in FIG. 1 for simplicity, the controller 114 may comprise a scheduler, that is to say the controller 104 may provide the scheduling function for the base station.

An example UE 104a is shown in more detail to include a transmitter 116 for transmitting signals on the uplink of the wireless access interface to the eNodeB 103 and a receiver 118 for receiving signals transmitted by the base station 101 on the downlink via the wireless access interface. The UE 104a also comprises a storage medium 122, such as a solid state memory or similar, for storing data. The transmitter 116, receiver 118 and storage medium 112 are controlled by a controller 120. In the embodiments of the present disclosure, the UE 104a is a terminal device configured to operate using feMTC (Further Enhanced Machine Type Communications) or eNB-IoT (Enhanced Narrowband Internet of Things).

In this example, the terminal device 104a comprises a transmitter 116 for transmission of wireless signals, a receiver 118 for reception of wireless signals and a controller 120 configured to control the terminal device 104a. The controller 120 may comprise various sub-units for providing functionality in accordance with embodiments of the present disclosure as explained further herein. These sub-units may be implemented as discrete hardware elements or as appropriately configured functions of the controller 120. Thus the controller 120 may comprise a processor which is suitably configured/programmed to provide the desired functionality described herein using conventional programming/configuration techniques for equipment in wireless telecommunications systems. The transmitter 116, receiver 118 and controller 120 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 104a will in general comprise various other elements associated with its operating functionality, for example a power source, user interface, and so forth, but these are not shown in FIG. 1 in the interests of simplicity.

LTE Wireless Access Interface

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC- FDMA) on the radio uplink. The down-link and the up-link of a wireless access interface according to an LTE standard is presented in FIGS. 2 and 3.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1. However of particular relevance in understanding the example embodiments of the present technique are the downlink control channel referred to as the physical downlink control channel (PDCCH) and a shared channel of resources for transmitting data to UEs which is the physical downlink shared channel (PDSCH).

Figure 3:
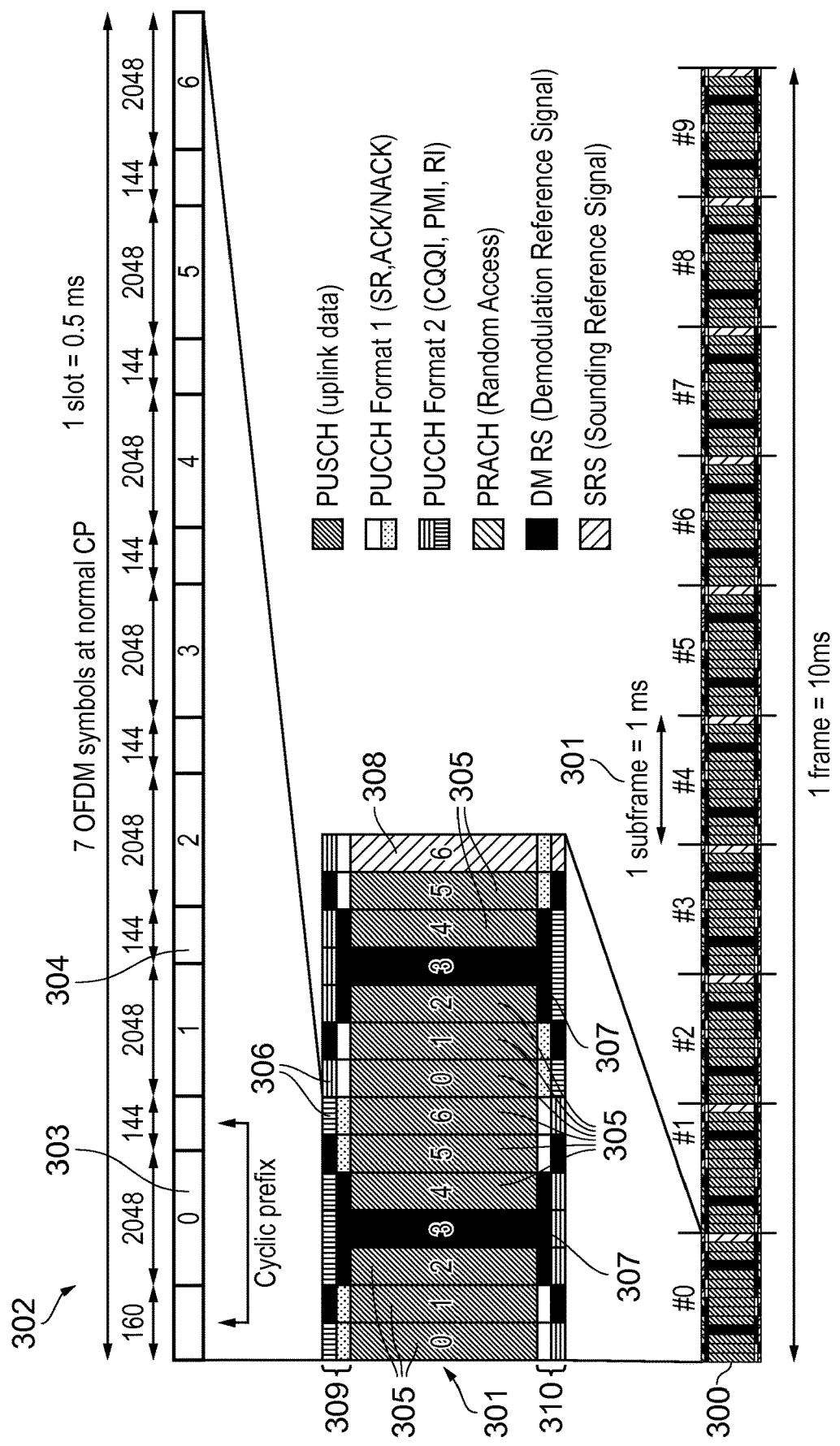
FIG. 3 provides a schematic diagram of an uplink of a wireless access interface of a mobile communications system operating according to an LTE standard.

FIG. 3 provides a simplified schematic diagram of the structure of an uplink of an LTE wireless access interface that may be provided by or in association with the base station of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. More details of the LTE up-link represented in FIG. 3 are provided in Annex 1.

The LTE data or datagram is transmitted on the PDSCH on the downlink and on the PUSCH in the uplink. The resources on the PDSCH and the PUSCH are allocated to the terminal device by the base station.

3GPP has completed two Rel-14 Work Items on Internet of Things (IoT) namely, feMTC (Further Enhanced Machine Type Communications) [2] and eNB-IoT (Enhanced Narrowband Internet of Things) [3]. It is expected that IoT will be developed further in Rel-15 where efforts in reducing UE power consumption will be specified.

MTC and NB-IoT UEs are expected to operate with coverage enhancements of 15 dB and 20 dB respectively. The main mechanism to enhance the coverage is by repeating a transmitted message numerous times. As an example the number of PUSCH repetitions can be up to 2048. Such long repetition transmission in the uplink uses up UE power and hence there is a motivation to reduce the transmission length and maintain the coverage.

During the design of eMTC (Enhanced Machine Type Communications) in the Rel-13 WI, it was proposed that the PUSCH repetitions can be early terminated by sending an early termination indicator to the UE when the eNB has correctly decoded the PUSCH packet [4]. This method would require the UE to monitor for this early termination indicator in the downlink while transmitting PUSCH in the uplink and is therefore applicable only for FD-FDD (Full Duplex-Frequency Division Duplex) UE and hence difficult for a HD-FDD (Half Duplex-Frequency Division Duplex) UE. An HD-FDD UE has a lower cost than an FD-FDD UE and better coverage/lower power consumption and therefore is likely to be widely deployed.

The repetition used on a channel such as the PUSCH targets a BLER (Block Error Rate) of 10%. One method to reduce the number of repetitions is to use a higher BLER target, e.g. 30%. For example, if the required PUSCH repetition for a UE is 1024 at 10% BLER, if the BLER target is increased to 30%, the PUSCH repetition is reduced to 512. If the PUSCH fails then a HARQ retransmission of another 512 repetitions is transmitted which would bring the overall BLER down to 10% (i.e. 1−(0.7+(0.3)(0.7))), where no soft combining gain is assumed for the HARQ retransmission for the sake of simplicity of exposition. The employment of a higher BLER target has a similar effect to early termination (in that the worst case number of repetitions does not always have to be transmitted to achieve the BLER target). However use of a higher BLER target would increase the overhead since each retransmission requires the eNB to transmit a DCI (carried by MPDCCH (MTC Physical Downlink Control Channel) or NPDCCH (Narrowband Physical Downlink Control Channel)).

Figure 4:
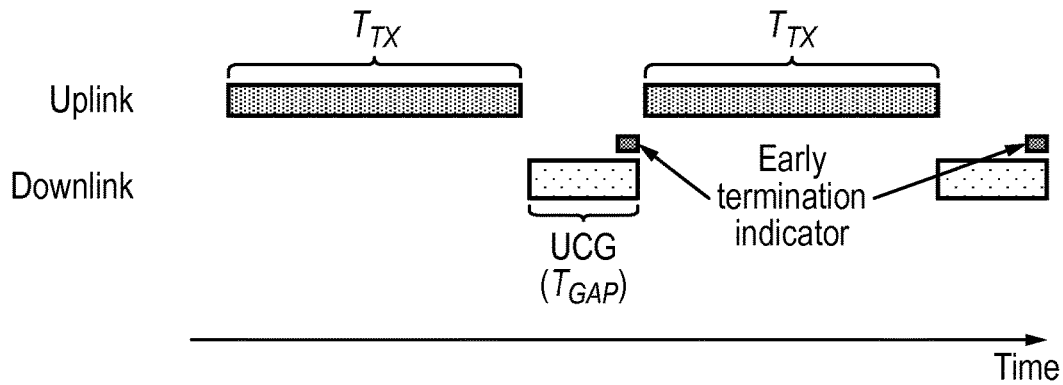
FIG. 4 provides a schematic diagram of an early termination indicator within an Uplink Compensation Gap (UCG)

Uplink Compensation Gap (UCG) is proposed in [5] for HD-FDD UEs performing long uplink transmissions. Since an HD-FDD UE cannot receive in the downlink (DL) while transmitting a long uplink (UL) transmission, the UE is unable to correct its internal frequency reference to the frequency of the signal transmitted by the eNodeB (since the act of correction would require the UE to monitor the DL transmission from the eNodeB and the HD-FDD UE cannot do this while transmitting in the UL). Since the frequency reference at the UE drifts with time, long UL transmissions lead to large, and increasing, frequency offsets between the UE and eNodeB. The mismatch between the frequency of the UE's frequency reference and that of the eNodeB is termed the frequency tracking offset (FTO). If the frequency has drifted by more than a certain amount, the UE would take a long time to regain tracking of its downlink frequency (i.e. would take a long time to correct its internal frequency reference to the frequency of the transmission from the eNodeB). Hence, for a long uplink transmission, a UCG of duration $T_{GAP}$ is introduced for every uplink transmission of duration $T_{TX}$ as shown in FIG. 4. During the UCG the UE switches from uplink to downlink and corrects its frequency tracking offset to a tolerable level by measuring reference signals and/or synchronisation channels (or the physical broadcast channel (PBCH)) in the downlink.

In [5], it is also proposed that an early termination indicator transmitted in the form of a DCI (Downlink Control Information) is transmitted during the UCG. Since the UE needs to switch to the downlink for FTO, it is therefore a good opportunity to also transmit the early termination indicator during this time instead of requiring the HD-FDD UE to switch to the downlink just to monitor this early termination indicator (as shown in FIG. 4). However, the length of the UCG is specified to provide just sufficient time for the UE to reduce its FTO to a tolerable level and this may not leave sufficient time for the UE to further decode anything in the downlink. Furthermore, in the UCG, the UE is expected to use existing LTE-M (LTE Machine to Machine) signals (PBCH (Physical Broadcast Channel), SSS (Secondary Synchronisation Signal), CRS (Cell-Specific Reference Signal) or the like) in order to perform FTO correction and the gap period is hence dimensioned based on the timing of these signals.

In an embodiment of the present disclosure, additional synchronisation signals are included in the early termination indicator such that the early termination indicator is used for reducing FTO and also indicating a termination of the repetition.

More generally, a terminal device 104a of the present disclosure comprises a transmitter 116 configured to transmit a first radio signal (such as a PUSCH radio signal) to infrastructure equipment 101a of a wireless telecommunications system. The first radio signal is repeatedly transmitted a predetermined number of times during each of a plurality of consecutive time periods, each of the plurality of consecutive time periods being separated by a separation time period (such as a UCG time period). The terminal device 104a comprises a receiver 118 configured to receive, from the infrastructure equipment 101a and during one of the separation time periods, a second radio signal, the second radio signal comprising an indicator indicating that transmission of the first radio signal to the infrastructure equipment should continue or that transmission of the first radio signal to the infrastructure equipment should be terminated. The second radio signal has a measurable characteristic on the basis of which the terminal device is operable to reduce an offset of a reference radio frequency of the terminal device relative to a transmission radio frequency of the infrastructure equipment (that is, reduction of the FTO of the terminal device). The terminal device 104a comprises a controller 120 configured, on the basis of the received second radio signal, to control the transmitter to continue or to terminate transmission of the first radio signal and to reduce an offset of the reference radio frequency of the terminal device relative to the transmission radio frequency of the infrastructure equipment.

Also, more generally, infrastructure equipment 101a of the present disclosure comprises a receiver 112 configured to repeatedly receive a first radio signal (such as a PUSCH radio signal) from a terminal device 104a of the wireless telecommunications system. The first radio signal is repeatedly transmitted by the terminal device a predetermined number of times during each of a plurality of consecutive time periods, each of the plurality of consecutive time periods being separated by a separation time period (such as a UCG time period). The infrastructure equipment 101a comprises a controller 114 configured to determine whether information comprised within the first radio signal has been successfully obtained. The infrastructure equipment 101a comprises a transmitter 110 configured to transmit to the terminal device, in response to the information comprised within the first radio signal being determined to have been successfully obtained and during one of the separation time periods, a second radio signal. The second radio signal comprises an indicator (termination indicator) indicating that transmission of the first radio signal to the infrastructure equipment should be terminated. The second radio signal has a measurable characteristic on the basis of which the terminal device is operable to reduce an offset of a reference radio frequency of the terminal device relative to a transmission radio frequency of the infrastructure equipment (that is, reduction of the FTO of the terminal device). Furthermore, in an embodiment, in response to the information comprised within the first radio signal not being determined to have been successfully obtained and during one of the separation time periods, the transmitter 110 is configured to transmit the second radio signal to the terminal device, the second radio signal comprising an indicator (continue/continuation indicator) indicating that transmission of the first radio signal to the infrastructure equipment should continue. In this case, the second radio signal again has a measurable characteristic on the basis of which the terminal device is operable to reduce an offset of a reference radio frequency of the terminal device relative to a transmission radio frequency of the infrastructure equipment (that is, reduction of the FTO of the terminal device).

In an embodiment, the indicator of the second radio signal comprises one of a first data sequence indicating that transmission of the first radio signal should continue and a second data sequence indicating that transmission of the second radio signal should be terminated. For example, each UE may be configured with a set of sequences, one for early termination and another for continued repetition. On a per-UE basis, one sequence from this set of sequences is transmitted at the start of a UCG and can be used by the UE to perform downlink frequency tracking. In an example decoding algorithm for such sequences, the UE considers a set of hypotheses of {FTO, sequence transmitted} and derives a metric for each hypothesis. The metric could for example be a correlation of the received sequence with the hypothesised frequency offset transmitted sequence. The metric with the highest value will then indicate to the UE both the FTO and whether "early termination" or "continue" had been signalled by the eNodeB. In this case, a storage medium 122 of the UE is configured to store information indicative of each of the first and second data sequences. The controller 120 is then configured to determine a metric for each of the first and second data sequences, the metric indicating an extent of correlation of the one of the first and second data sequences comprised within the second radio signal with each of the first and second data sequences information indicative of which is stored. The controller 120 then determines the one of the first and second data sequences comprised within the second radio signal and an offset of the reference radio frequency of the terminal device relative to the transmission radio frequency of the infrastructure equipment based on the metric indicating the greatest extent of correlation.

Figure 5:
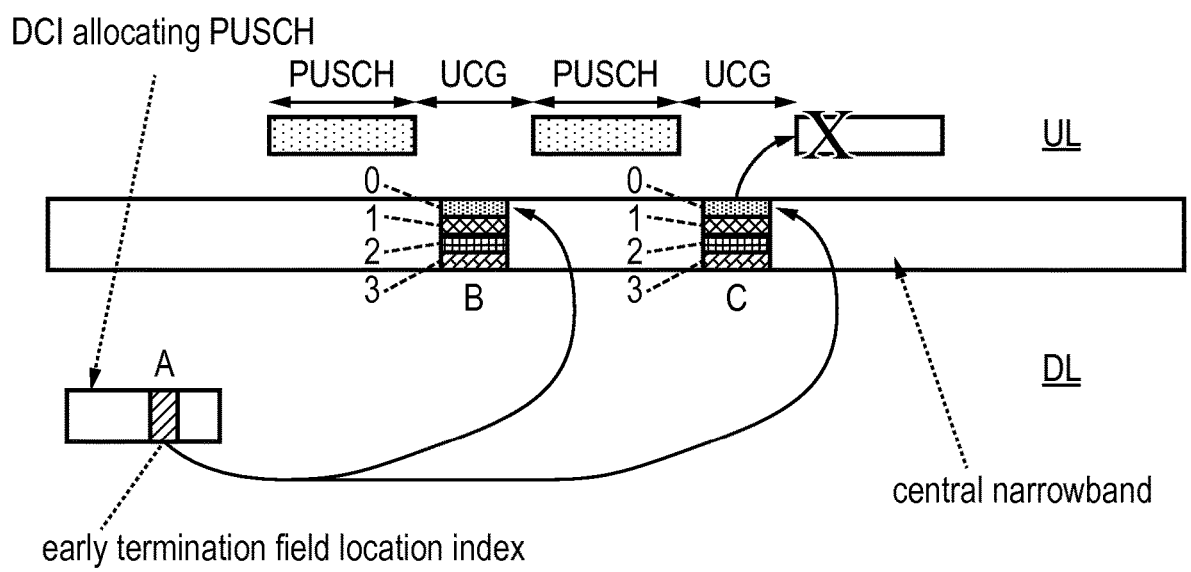
FIG. 5 provides a schematic diagram of radio signals coded using different data sequences, each of the radio signals being measurable in order to correct frequency tracking offset (FTO) and comprising an early termination indicator.

In an embodiment, the one of the first and second data sequences of the second radio signal is one of a plurality of predetermined data sequences, and the receiver 118 is configured to receive control information from the infrastructure equipment indicating the one of the plurality of predetermined data sequences that is to be used as the one of the first and second data sequences. For example, the sequence that the UE shall use may be indicated in the DCI that allocates the PUSCH. The DCI that allocates the PUSCH contains both a description of the PUSCH resources allocated and an early termination location index field. This is exemplified in FIG. 5. FIG. 5 shows that the early termination location index field ("A") indicates that the UE is to use sequence "0" to decode the indicator carried in the second radio signal. During UCG "B", the UE decodes sequence "0" and determines that there is no early termination indicator (in this case, the sequence "0" is associated with a second data sequence which represents an early termination indicator). During UCG "C", the UE decodes sequence "0" and determines there is an early termination indication for the UE and hence stops transmission of the PUSCH (as shown by the "X"). In this case, the PUSCH is the first radio signal which is repeatedly transmitted from the UE. It is noted that, in this example, each of the sequences "0", "1", "2" and "3" is different, thus allowing a plurality of UEs to be allocated a different respective sequence for decoding an indicator contained in a second radio signal transmitted to each UE. In another example, the early termination location index field is transmitted to the UE 104a by the network (for example, by the base station 101a) using RRC (radio resource control) signalling.

In an embodiment, the second radio signal is transmitted using a radio frequency band used by the UE for performing synchronisation. That is, the second radio signal is transmitted using radio resources in a frequency band used for transmitting a synchronisation signal to the terminal device. In MTC (in particular, eMTC (Enhanced Machine Type Communication), feMTC (Further Enhanced Machine Type Communication) and efeMTC (Even Further Enhanced Machine Type Communication)), this is the central narrowband where the synchronisation channels (PSS (Primary Synchronisation Signal)/SSS (Secondary Synchronisation Signal)) are located. In this case, the above described first or second data sequences may be transmitted using symbols other than those containing synchronisation channels such as PSS/SSS and PBCH (Physical Broadcast Channel).

Figure 6:
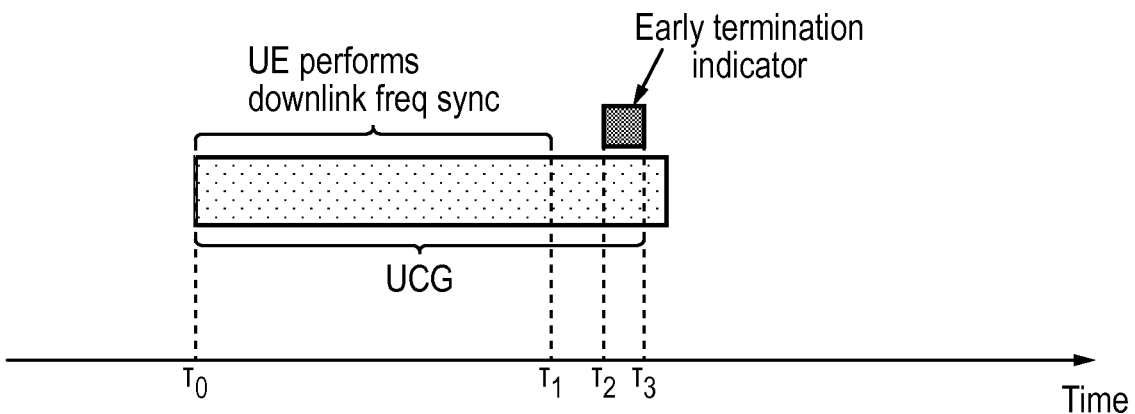
FIG. 6 provides a schematic diagram of a radio signal comprising an early termination indicator transmitted within a UCG.

In an embodiment, the second radio signal is transmitted over a time period starting at a first time (for example, time $T_0$ in FIG. 6). A portion of the second radio signal comprising the indicator is transmitted over a time period starting at a second time (for example, $T_2$ in FIG. 6), the second time being later than the first time. A portion of the second radio signal transmitted over the time period defined between the first time and the second time comprises the measurable characteristic on the basis of which the terminal device is operable to reduce an offset of the reference radio frequency of the terminal device relative to the transmission radio frequency of the infrastructure equipment (that is, reduce the FTO). In the example of FIG. 6, the UE 104a is able to reduce its FTO relative to the infrastructure equipment 101a over the time period defined between $T_0$ and $T_1$ (this being a portion of the time period defined between $T_0$ and $T_2$). In the example of FIG. 6, an early termination indicator is thus transmitted towards the end of a UCG. The UCG is used for the UE to regain its frequency synchronisation so that it is within a tolerable offset and hence it is beneficial that the UE has regained sufficient frequency synchronisation in the downlink before receiving any further downlink transmissions such as the early termination indicator. Improved frequency synchronisation increases the reliability of decoding of the early termination indicator.

Figure 7:
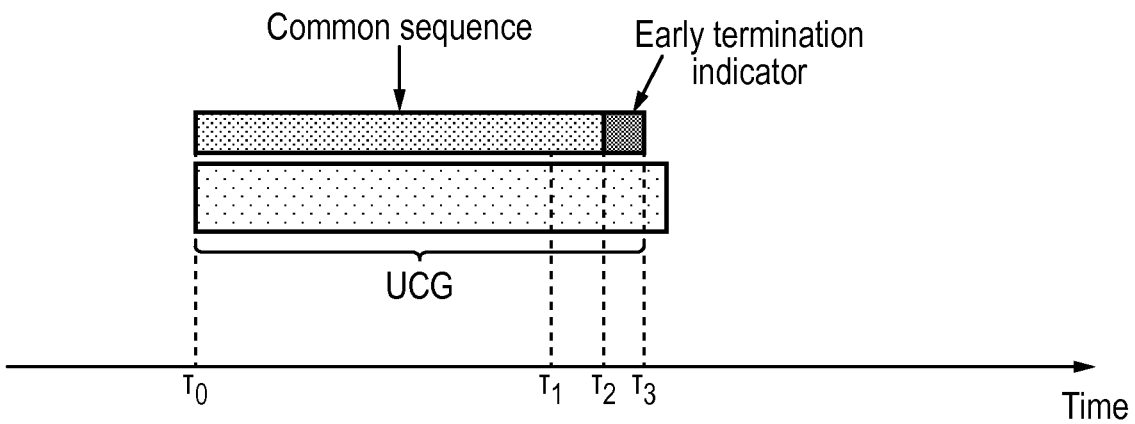
FIG. 7 provides a schematic diagram of a radio signal comprising an early termination indicator transmitted within a UCG, the radio signal comprising a common data sequence.

In an embodiment, the measurable characteristic of the second radio signal (as comprised within the portion of the second radio signal transmitted over the time period defined between the first time and the second time) is measurable by each of a plurality of terminal devices, whereas the indicator of the second radio signal (as comprised within the portion of the second radio signal transmitted over the time period starting at the second time) is associated with the terminal device 104a only. In one example, the portion of the second radio signal transmitted over the time period defined between the first time and the second time comprises a common data sequence associated with the plurality of terminal devices, the measurable characteristic being measurable based on the common data sequence. The portion of the second radio signal transmitted after the second time then comprises a specific data sequence associated with the terminal device 104a only (for example, the specific data sequence is used for decoding the indicator and is stored in the storage medium 122 of the terminal device 104a only, not within a storage medium of any of the other UEs). This is exemplified in FIG. 7, in which, a known sequence is transmitted prior to transmission of information containing an early termination indicator. This known sequence is common to multiple UEs and so other UEs sharing the same UCG can benefit from such a sequence (in reducing their respective FTOs, for example). This allows the eNB to transmit only one sequence for FTO reduction for multiple UEs followed by an indicator that targets the individual UE 104a only.

In an embodiment, the second radio signal is transmitted from the infrastructure equipment 101a to the UE 104a in a beamformed manner. This enables the UE 104a to both reduce its FTO relative to the infrastructure equipment 101a and to determine whether to continue or to terminate transmission of the first radio signal when it is at a further distance and/or in less favourable radio conditions compared to when an omnidirectional beam is used, for example.

In an embodiment, the second radio signal comprises a first portion transmitted over a time period defined between a first time and a second, later, time, a second portion defined between the second time and a third, later, time and a third portion defined between the third time and a fourth, later, time. Each of the first and third portions of the second radio signal comprises the measurable characteristic on the basis of which the terminal device is operable to reduce an offset of the reference radio frequency of the terminal device relative to the transmission radio frequency of the infrastructure equipment. The second portion comprises the indicator of the second radio signal.

Figures 8, 9:
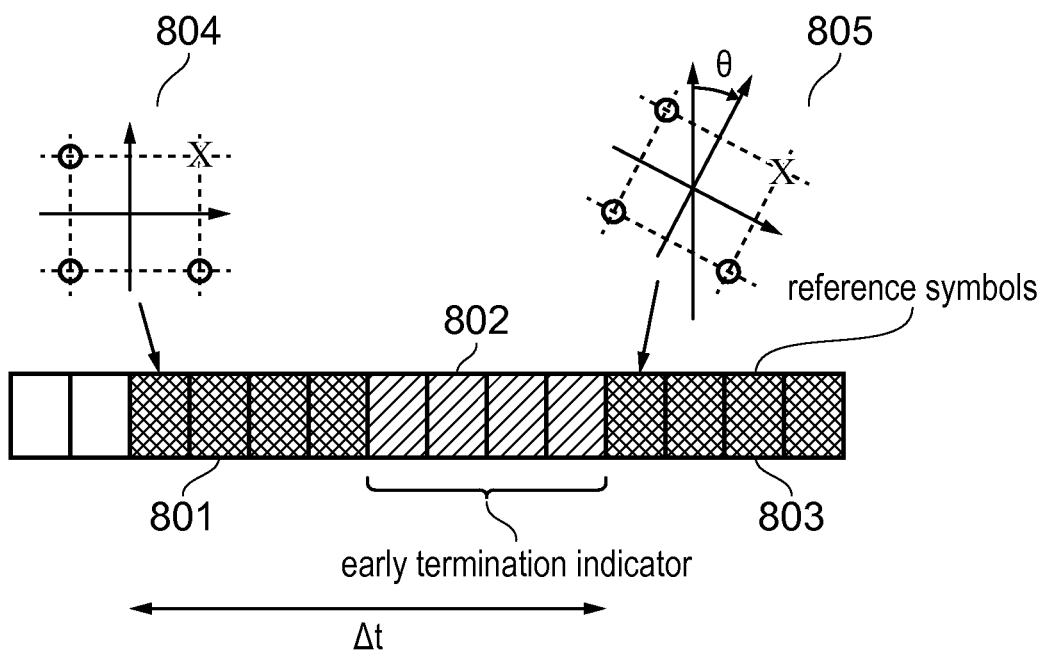
FIG. 8 provides a schematic diagram of a constellation which is rotated due to frequency offset between a terminal device and infrastructure equipment of a wireless telecommunications network and a location of an early termination indicator.
FIG. 9 provides a schematic diagram of a DCI comprising early termination indicators for a plurality of different terminal devices.

Such an arrangement serves to more easily facilitate FTO reduction, due to the separation in time of the first and third portions of the second radio signal comprising the measurable characteristic. For example, when the measurable characteristic is the phase difference between frequency offset reference signals of the second radio signal, then the greater the separation in time between the first and third portions of the second radio signal, the greater the phase angle that the UE can measure between the frequency offset reference signals (where a frequency offset reference signal is any reference signal that can be used for performing frequency tracking offset correction, e.g. CRS (Cell-Specific Reference Signal) or other reference signal with a known sequence). A frequency offset can be determined based on the difference in phase angle and the known time between which the phase angles are measured. This separation in time can be increased by transmitting the indicator of the second radio signal at a time between the transmission of sets of reference symbols associated with the frequency offset reference signals in the first and third portions of the second radio signal. This is exemplified in FIG. 8, in which an early termination indicator in a second portion 802 of the second radio signal is placed between first and third portions 801, 803 of the second radio signal. This arrangement maximises the time duration between the reference symbols of the first and third portions 801, 803. FIG. 8 also shows two constellation diagrams 804, 805. The constellation 804 is received at the start of the subframe in a non-rotated manner. The constellation 805 is rotated due to frequency offset between the UE 104a and eNodeB 101a. The UE 104a is able to measure the angle θ. Based on the angle θ and the time between measurements, Δt, the UE (in particular, the controller 120) is able to estimate the frequency error as θ/Δt. A more accurate frequency error estimate is obtained if θ is large and hence if the distance between the frequency offset reference signals of the first and third portions of the second radio signal is as large as possible.

Figure 10:
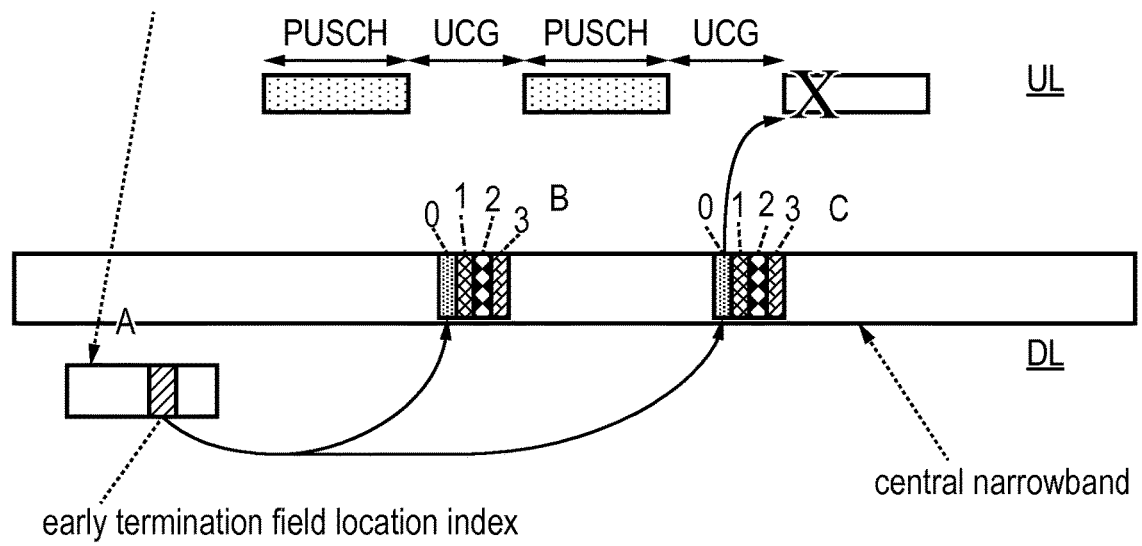
FIG. 10 provides a schematic diagram showing the allocation of different early termination indicators to different terminal devices using a DCI.

In an embodiment, the receiver 118 is configured to receive control information from the infrastructure equipment 101a. The control information indicates a portion of the second radio signal within which the indicator of the second radio signal is located. The controller 120 then obtains the indicator from the portion of the second radio signal indicated by the control information. In one example, an indicator is transmitted using broadcast DCI (Downlink Control Information), such as Format 3 used for TPC (Transmit Power Control). The broadcast DCI may be transmitted in conjunction with a sequence used for FTO (for example, the common data sequence shown in FIG. 7). The UE 104a is configured an index (an early termination field location index) within the broadcast DCI, as shown in an example in FIG. 9, in which UE1 is configured to look in the field indexed 00 within the DCI, UE2 is configured to index 01 and so on. Hence, the DCI itself carries the indicator for the UE in this case. In this example, UE1 is assigned "early termination field location index"=00 and attempts to decode an indicator in the location marked "00 UE1" in the DCI. UE2 is assigned "early termination field location index"=01 and attempts to decode an indicator in the location marked "01 UE2" in the DCI. Similarly, UE3 and UE4 are assigned, respectively, "early termination field location index"=02 and 03 and each attempt, respectively, to decode an indicator located in the location marked "02 UE3" and "03 UE4" in the DCI. In this embodiment, the UE needs to be informed where it should look for the indicator in the DCI (that is, whether it can be considered to be UE1, UE2, UE3 or UE4 in FIG. 9). In one example, this information is configured by the network (for example, by the base station 101a) using RRC (radio resource control) signalling. In another example, the UE is told this information in the DCI that allocates the PUSCH transmission, as shown in FIG. 10. In this case, the control information indicating the portion of the second radio signal within which the indicator of the second radio signal is located is the DCI that allocates radio resources for PUSCH, and the indicator of the second radio signal is comprised within further DCI.

The example of FIG. 10 is described as follows. The UE 104a is assigned PUSCH resources using a DCI labelled "A". The DCI assigns the PUSCH (in the way as known in the prior art) and additionally includes an "early termination field location index". This "early termination field location index" indicates to the UE that it has been assigned index "00". During a first UCG, the UE switches to the downlink. During the first UCG, the UE also decodes a DCI "B" (note that this DCI is in a different DCI format to the DCI labelled "A") containing the indicators for a plurality of UEs (including the UE 104a). The UE extracts the indicator from location "00" in this DCI (since it was assigned "early termination field location index"=0). In this case, the indicator does not indicate early termination to the UE (for example, the indicator may indicate that PUSCH transmissions should continue) and the UE continues to transmit PUSCH after the first UCG. During the second UCG, the UE decodes DCI "C" (DCI "C" being in the same format as DCI "B"). In this case, the indicator in "early termination field location index"=0 indicates that the PUSCH transmission is to be terminated and hence the third repetition of PUSCH is not transmitted by the UE (as indicated by the "X").

Note that, in FIG. 10, the DCI ("B", "C") carrying the indicators are transmitted in a central MTC narrowband, since this central narrowband is rich in reference signals that can be used for FTO correction. The DCI ("A") allocating the PUSCH is transmitted in an arbitrary location (which, in FIG. 10, is shown as being outside the central MTC narrowband).

In an embodiment, the one of the separation time periods during which the second radio signal is received occurs after a predetermined number of previous ones of the separation time periods during each of which the second radio signal is not transmitted. For example, the second radio signal may only be transmitted during the latter UCGs of a PUSCH transmission.

For example, if a PUSCH transmission is long enough to require 8 UCG, then the first 4 UCGs do not contain the second radio signal (since it is unlikely that early termination will be possible with a small number of PUSCH repetitions), but the latter 4 UCG do contain the second radio signal. The UE 104a can be configured with which of the UCGs potentially contain the second radio signal.

In an embodiment, there can be a specific channel used for transmission of the second radio signal. This channel does not have to be located in the central MTC narrowband. This dedicated channel can contain a rich set of reference signals to (1) facilitate decoding of the indicator of the second radio signal and (2) help the UE 104a to efficiently correct its FTO.

In an embodiment, and as previously mentioned, the indicator of the second radio signal may indicate to the UE 104a whether to continue repeated transmission of the first radio signal (for example, PUSCH transmissions) as originally scheduled or to terminate the repeated transmission of the first radio signal. Such an indicator (whether it indicates a continuation or termination of the repetition) may be referred to as an early termination indicator.

In some embodiments, there may only be one type of early termination indicator. When it is detected at the UE 104a, the controller 120 controls the transmitter 116 to terminate transmission of the first radio signal. When it is not detected, the controller 120 controls the transmitter 116 to continue transmission of the first radio signal. Alternatively, when the indicator is detected at the UE 104a, the controller 120 controls the transmitter 116 to continue transmission of the first radio signal. When the indicator is not detected, the controller 120 controls the transmitter 116 to terminate transmission of the first radio signal.

In other embodiments, there may be two types of early termination indicator, one indicating to the controller 120 to control the transmitter 116 to terminate transmission of the first radio signal and the other indicating to the controller 120 to control the transmitter 116 to continue transmission of the first radio signal. In one such embodiment, the early termination indicator is represented by a single bit. That is, the indicator of the second radio signal comprises one of a first bit value (such as "0") indicating that transmission of the first radio signal to the infrastructure equipment 101*a* should continue and a second bit value (such as "1") indicating that transmission of the first radio signal to the infrastructure equipment 101*a* should be terminated.

In an embodiment, the indicator of the second radio signal indicates that transmission of the first radio signal to the infrastructure equipment 101*a* is to be terminated after a predetermined number of further transmissions of the first radio signal. The controller 120 then controls the transmitter 116 to terminate transmission of the first radio signal to the infrastructure equipment after the predetermined number of further transmissions of the first radio signal have been completed. That is, the early termination indicates the number of repetitions that the UE 104*a* needs to transmit before (early) terminating. For example, consider a situation in which the UE 104*a* is scheduled to transmit 1024 repetitions for PUSCH. In one of the UCG (e.g. at 512 repetitions), the eNB 101*a* sends an early termination indicator to tell the UE to transmit another 64 repetitions before terminating. This allows a total of 576 repetitions to be transmitted (instead of the 1024 repetitions). This embodiment recognises that the separation time periods such as the UCG may not be placed at a point at which repetitions can terminate, but that UE power can be saved if the early termination indicator is able to nonetheless inform the UE of a certain number of further repetitions before termination. For example, if the eNB requires 576 repetitions and the UCG is placed at every 256 repetitions, then, normally, the UE will have to terminate after 768 (256×3=768) repetitions (in response to receiving an early termination indicator after 768 repetitions), thereby wasting power transmitting an additional 192 repetitions. On the other hand, if an early termination indicator transmitted after 512 (256×2=512) repetitions indicates that only 64 further repetitions should be transmitted, then the required number of 576 repetitions is transmitted, without the additional 192 repetitions which are not actually needed. The reduction in the number of repetitions helps reduce UE power consumption.

In embodiments, there is the possibility that the UE may incorrectly interpret a "continue" indicator as a "termination" indicator. If the UE does make this incorrect interpretation, it will stop transmission of the PUSCH and a re-transmission of the PUSCH will be required. This results in reduced efficiency of communication resources and an increase in UE power consumption. In order to alleviate this, in an embodiment, in response to the controller 120 determining that the receiver 118 has received a second radio signal comprising an indicator indicating that transmission of the first radio signal to the infrastructure equipment 101*a* should be terminated, the controller 120 determines whether the receiver 118 receives a subsequent radio signal comprising a further indicator indicating that transmission of the first radio signal to the infrastructure equipment should be terminated. If it is determined that a subsequent radio signal comprising a further indicator indicating that transmission of the first radio signal to the infrastructure equipment should be terminated is received, then the controller 120 controls the transmitter 116 to terminate transmission of the first radio signal to the infrastructure equipment. On the other hand, if it is determined that a subsequent radio signal comprising a further indicator indicating that transmission of the first radio signal to the infrastructure equipment should be terminated is not received, then the controller 120 controls the transmitter 116 to continue transmission of the first radio signal to the infrastructure equipment.

In an example of this embodiment, in which the first radio signal transmitted to the infrastructure equipment 101*a* is a PUSCH transmission, if the UE decodes an early termination indicator, then it performs the following steps:

Abort transmission of the current PUSCH

At the next scheduled UCG, decode for the "continue"/"termination" indicator

If a "termination" indicator is decoded, the UE 104*a* confirms that the PUSCH had been terminated and flushes the PUSCH transmission from its buffer. This signal could be considered to be a "termination confirm" indicator.

If a "continue" indicator is decoded, the UE 104*a* continues transmission of the PUSCH and updates its protocol state machine to reflect the fact that this PUSCH had in fact not been terminated early.

An example is described with reference to FIG. 11:

A: UE 104*a* transmits a set of PUSCH repetitions.

B: In UCG, the eNB 101*a* transmits a "continue" indicator and the UE correctly receives that "continue" indicator. Hence the UE re-transmits the PUSCH.

C: In UCG, the eNB transmits a "continue" indicator, but the UE incorrectly decodes this as a "termination" indicator.

D: The UE therefore does not transmit PUSCH (on the understanding that it had received a "termination" indicator). The eNodeB attempts to decode the PUSCH that it expected to be transmitted by the UE, but determines that the PUSCH was not transmitted by the UE (and hence understands that the UE falsely detected a "termination" indicator).

E: eNodeB transmits a "continue" indicator within the UCG and this is received correctly by the UE.

F: UE continues the transmission of its previous PUSCH (by transmitting further repetitions). This is correctly received by the eNodeB.

G: eNodeB transmits "termination" indicator to the UE and this is correctly received by the UE.

H: eNodeB repeats transmission of the "termination" indicator. The UE receives this indicator for a second time. This "termination" indicator confirms the previous "termination" indicator (at "G"), so the UE terminates transmission of the PUSCH and flushes the PUSCH transport block from its buffers. The UE may then return to monitoring MPDCCH (MTC Physical Downlink Control Channel) search spaces in the DL (downlink).

In the case that there is only a "termination" indicator and a "continue" indicator is not routinely transmitted, the UE 104*a* can still incorrectly detect a "termination" indicator even when no such indication was transmitted by the eNodeB 101*a*. To alleviate this error scenario, in another example, the UE monitors for a confirmation of the "termination" indicator in the UCG following the UCG in which it decoded a "termination" indicator. This example is described with reference to FIG. 12:

A: UE 104*a* transmits a set of PUSCH repetitions.

B: In UCG, the UE does not receive a "termination" indicator. Hence the UE re-transmits the PUSCH.

C: In UCG, the eNB 101*a* does not transmit any "termination" indicator, but the UE incorrectly detects a "termination" indicator.

D: UE therefore does not transmit PUSCH (on the understanding that it had received a "termination" indicator). The eNodeB attempts to decode the PUSCH that it expected to be transmitted by the UE, but determines that PUSCH was not transmitted by the UE (and hence understands that the UE falsely detected a "termination" indicator).

E: eNodeB transmits a "continue" indicator within the UCG and this is received correctly by the UE. This "continue" indicator is transmitted in order to correct the "termination" indicator falsely detected by the UE.

F: UE continues the transmission of its previous PUSCH (by transmitting further repetitions). This is correctly received by the eNodeB.

G: eNodeB transmits "termination" indicator to the UE and this is correctly received by the UE H: eNodeB repeats transmission of the "termination" indicator. The UE receives this indicator for a second time. This "termination" indicator confirms the previously received "termination" indicator (received at "G"), so the UE terminates transmission of the PUSCH and flushes the PUSCH transport block from its buffers. The UE may then return to monitoring MPDCCH search spaces in the DL.

Note that transmission of the "continue" indicator in step "E" is not an essential aspect of this embodiment. In an alternative arrangement, a "continue" indicator is not sent from the eNB to the UE. Instead, the UE (under control of the controller 120) attempts to detect a confirmatory "termination" indicator at "E". When it does not receive a confirmatory "termination" indicator at "E", it resumes transmission of PUSCH at "F".

Figure 11:
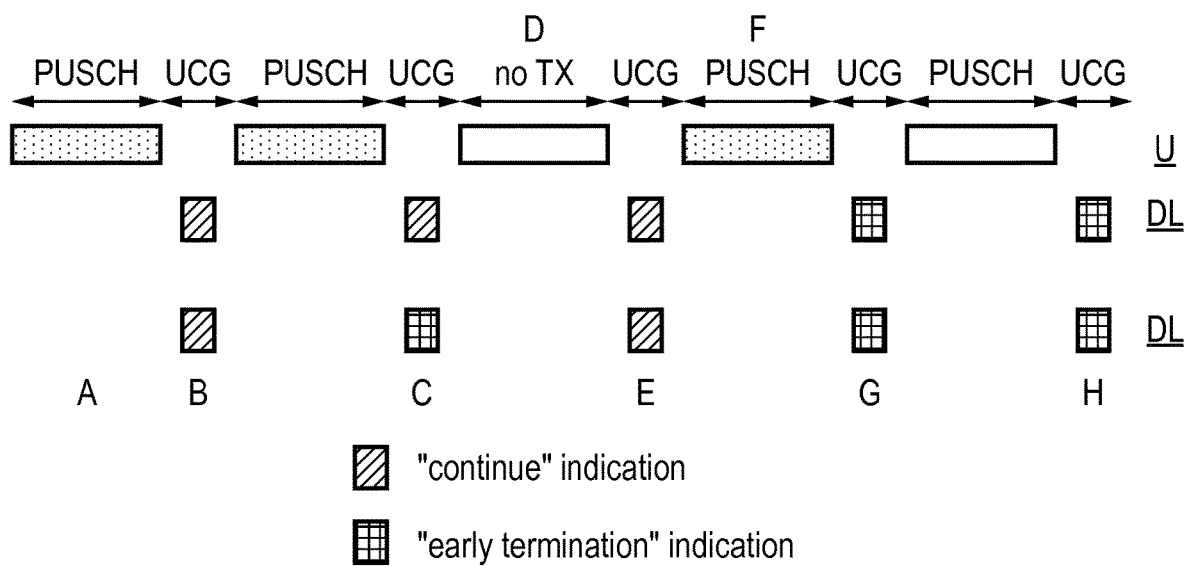
FIG. 11 provides a schematic diagram showing a first example of alleviating incorrect detection of a "termination" indicator.
Figure 12:
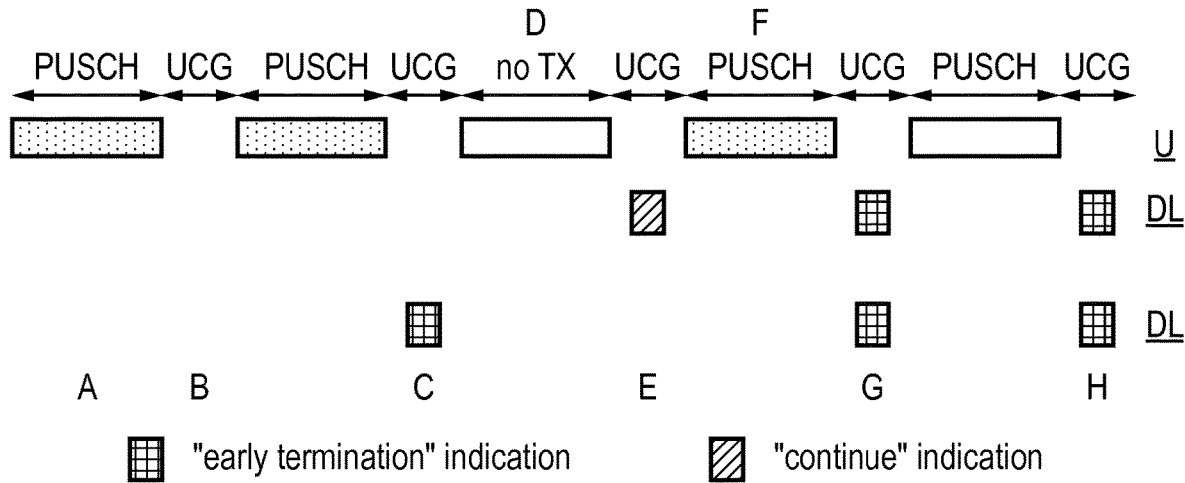
FIG. 12 provides a schematic diagram showing a second example of alleviating incorrect detection of a "termination" indicator.

It is noted that in steps D and E of both FIG. 11 and FIG. 12, in response to the controller 114 determining that the receiver 112 is no longer receiving expected repetitions of the first radio signal (in this case, PUSCH transmissions) and that the transmitter 110 has not transmitted a second radio signal comprising an indicator indicating that transmission of the first radio signal to the infrastructure equipment 101a should be terminated, the transmitter 110 is configured to transmit to the terminal device 104a a further radio signal comprising an indicator ("continue" indicator) indicating that transmission of the first radio signal to the infrastructure equipment should continue.

Alternatively to attempting to decode a confirmatory early termination indicator after a further PUSCH (such as at steps H in FIGS. 11 and 12), the UE can decode DCI candidates via MPDCCH/NPDCCH. If one of the DCI candidates indicates "continue", then the UE would continue transmission of its previous PUSCH transmission, thus alleviating the problem of terminating repetition following incorrect detection of a "termination" indicator. That is, a "continue" indicator is included in a DCI carried by MPDCCH/NPDCCH. This is an alternative method for alleviating the error case in which a "terminate" indicator is incorrectly decoded during UCG. Typically, when the UE 104a terminates a repetition, it will stop PUSCH transmission and switch to the downlink to monitor for possible scheduling grants in the MPDCCH/NPDCCH search space. A "continue" indicator transmitted using MPDCCH/NPDCCH would tell the UE that the previous PUSCH transmission was falsely terminated and therefore requests that the UE continues its repetition. Similarly, this DCI can indicate a "terminate" indicator to confirm that the previous transmission is rightly terminated.

Figure 13:
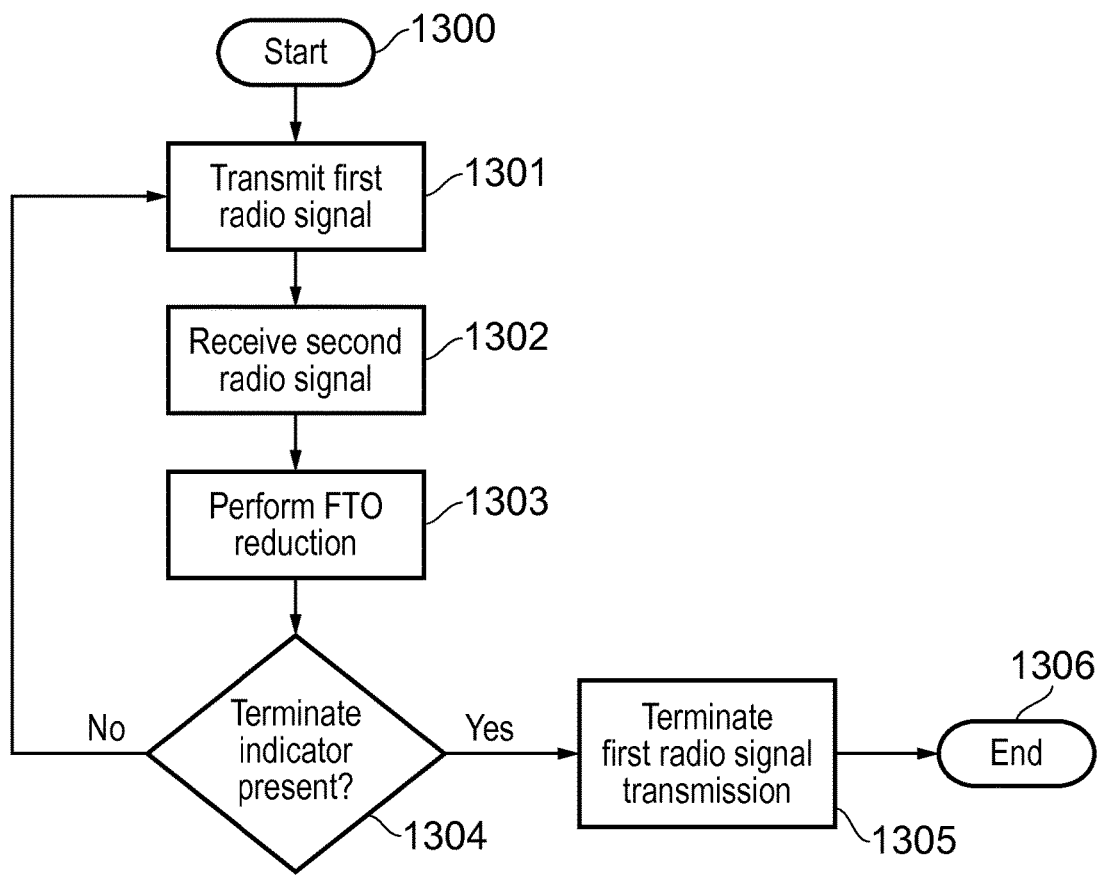
FIG. 13 illustrates a flow chart showing a method of operating a terminal device.

FIG. 13 illustrates a flow chart showing a process carried out by a terminal device 104a according to an embodiment of the present disclosure. The process starts at step 1300. At step 1301, the transmitter 116 is controlled to transmit a first radio signal to infrastructure equipment 101a of the wireless telecommunications system. The first radio signal is repeatedly transmitted a predetermined number of times during each of a plurality of consecutive time periods, each of the plurality of consecutive time periods being separated by a separation time period. At step 1302, the receiver 118 is controlled to receive, from the infrastructure equipment and during one of the separation time periods, a second radio signal. The second radio signal comprises an indicator indicating that transmission of the first radio signal to the infrastructure equipment should continue or that transmission of the first radio signal to the infrastructure equipment should be terminated. The second radio signal also has a measurable characteristic on the basis of which the terminal device is operable to reduce an offset of a reference radio frequency of the terminal device relative to a transmission radio frequency of the infrastructure equipment (that is, reduce the FTO of the terminal device). At step 1302, the FTO of the terminal device is reduced on the basis of the received second radio signal. At step 1303, it is determined whether the indicator of the second radio signal indicates that transmission of the first radio signal to the infrastructure equipment should be terminated (that is, whether the indicator is a terminate indicator). If it is determined that the indicator is not a terminate indicator, then the process returns to step 1301. On the other hand, if it is determined that the indicator is a terminate indicator, then the process proceeds to step 1305, at which the transmitter 116 is controlled to terminate transmission of the first radio signal. The process then ends at step 1306.

Figure 14:
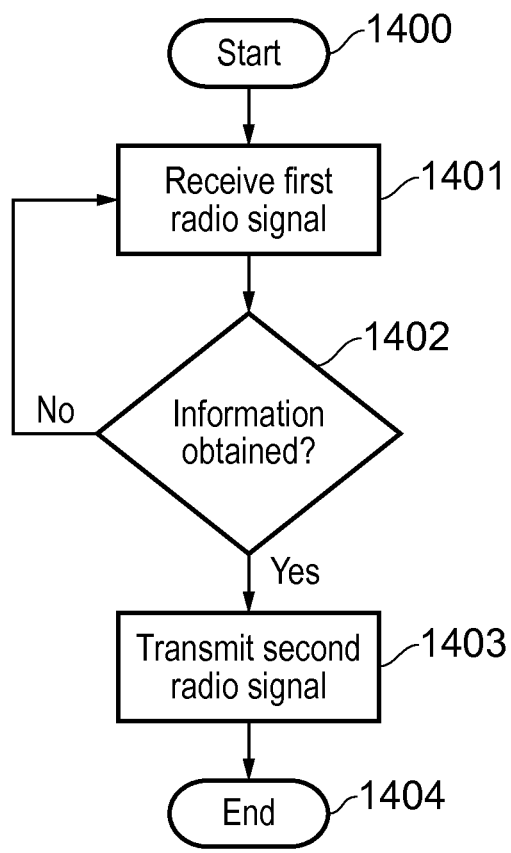
FIG. 14 illustrates a flow chart showing a method of operating infrastructure equipment.

FIG. 14 illustrates a flow chart showing a process carried out by infrastructure equipment 101a according to an embodiment of the present disclosure. The process starts at step 1400. At step 1401, the receiver 112 of the infrastructure equipment is controlled to repeatedly receive a first radio signal from a terminal device 104a of the wireless telecommunications system. The first radio signal is repeatedly transmitted by the terminal device a predetermined number of times during each of a plurality of consecutive time periods, each of the plurality of consecutive time periods being separated by a separation time period. At step 1402, it is determined whether information comprised within the first radio signal has been successfully obtained. If it is determined that the information has not been successfully obtained, then the process returns to step 1401. On the other hand, if it is determined that the information has been successfully obtained, then the process proceeds to step 1403. At step 1403, the transmitter 110 is controlled to transmit to the terminal device, during one of the separation time periods, a second radio signal. The second radio signal comprises an indicator indicating that transmission of the first radio signal to the infrastructure equipment should be terminated (that is, a terminate indicator). The second radio signal also contains a measurable characteristic on the basis of which the terminal device is operable to reduce an offset of a reference radio frequency of the terminal device relative to a transmission radio frequency of the infrastructure equipment (that is, reduce the FTO of the terminal device). The process then ends at step 1404.

Features of some embodiments of the present disclosure are defined by the following numbered clauses:

1. A terminal device for use in a wireless telecommunications system, the terminal device comprising:
   a transmitter configured to transmit a first radio signal to infrastructure equipment of the wireless telecommunications system, the first radio signal being repeatedly transmitted a predetermined number of times during each of a plurality of consecutive time periods, each of the plurality of consecutive time periods being separated by a separation time period;

a receiver configured to receive, from the infrastructure equipment and during one of the separation time periods, a second radio signal, the second radio signal comprising an indicator indicating that transmission of the first radio signal to the infrastructure equipment should continue or that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment; and a controller configured, on the basis of the received second radio signal, to control the transmitter to continue or to terminate transmission of the first radio signal and to reduce an offset of the reference radio frequency of the terminal device relative to the transmission radio frequency of the infrastructure equipment.

2. A terminal device according to clause 1, wherein:
the indicator of the second radio signal comprises one of a first data sequence indicating that transmission of the first radio signal should continue and a second data sequence indicating that transmission of the second radio signal should be terminated.

3. A terminal device according to clause 2, comprising a storage medium configured to store information indicative of each of the first and second data sequences, wherein the controller is configured:
to determine a metric for each of the first and second data sequences, the metric indicating an extent of correlation of the one of the first and second data sequences comprised within the second radio signal with each of the first and second data sequences information indicative of which is stored, and
to determine the one of the first and second data sequences comprised within the second radio signal and an offset of the reference radio frequency of the terminal device relative to the transmission radio frequency of the infrastructure equipment based on the metric indicating the greatest extent of correlation.

4. A terminal device according to clause 2 or 3, wherein:
the one of the first and second data sequences is one of a plurality of predetermined data sequences; and
the receiver is configured to receive control information from the infrastructure equipment indicating the one of the plurality of predetermined data sequences that is to be used as the one of the first and second data sequences.

5. A terminal device according to clause 4, wherein the control information is downlink control information (DCI) allocating radio resources for a physical uplink shared channel (PUSCH).

6. A terminal device according to clause 4, wherein the control information is comprised within radio resource control (RRC) signalling.

7. A terminal device according to clause 1, wherein the indicator of the second radio signal comprises one of a first bit value indicating that transmission of the first radio signal to the infrastructure equipment should continue and a second bit value indicating that transmission of the first radio signal to the infrastructure equipment should be terminated.

8. A terminal device according to any preceding clause, wherein:
the receiver is configured to receive control information from the infrastructure equipment, the control information indicating a portion of the second radio signal within which the indicator of the second radio signal is located; and
the controller is configured to obtain the indicator from the portion of the second radio signal indicated by the control information.

9. A terminal device according to clause 8, wherein:
the control information is downlink control information (DCI) allocating radio resources for a physical uplink shared channel (PUSCH); and
the indicator of the second radio signal is comprised within further downlink control information (DCI).

10. A terminal device according to clause 8, wherein:
the control information is comprised within radio resource control (RRC) signalling; and
the indicator of the second radio signal is comprised within downlink control information (DCI).

11. A terminal device according to any preceding clause, wherein the second radio signal is transmitted using radio resources in a frequency band used for transmitting a synchronisation signal to the terminal device.

12. A terminal device according to any preceding clause, wherein:
the second radio signal is transmitted over a time period starting at a first time;
a portion of the second radio signal comprising the indicator is transmitted over a time period starting at a second time, the second time being later than the first time; and
a portion of the second radio signal transmitted over the time period defined between the first time and the second time comprises the measurable characteristic on the basis of which the terminal device is operable to reduce an offset of the reference radio frequency of the terminal device relative to the transmission radio frequency of the infrastructure equipment.

13. A terminal device according to clause 12, wherein:
the measurable characteristic of the second radio signal is measurable by each of a plurality of terminal devices; and
the indicator of the second radio signal is associated with the terminal device only.

14. A terminal device according to clause 13, wherein:
the portion of the second radio signal transmitted over the time period defined between the first time and the second time comprises a common data sequence associated with the plurality of terminal devices, the measurable characteristic being measurable based on the common data sequence; and
the portion of the second radio signal transmitted after the second time comprises a specific data sequence associated with the terminal device only.

15. A terminal device according to any preceding clause, wherein:
the second radio signal comprises a first portion transmitted over a time period defined between a first time and a second, later, time, a second portion defined between the second time and a third, later, time and a third portion defined between the third time and a fourth, later, time;
each of the first and third portions of the second radio signal comprises the measurable characteristic on the basis of which the terminal device is operable to reduce an offset of the reference radio frequency of the terminal device relative to the transmission radio frequency of the infrastructure equipment; and the second portion comprises the indicator of the second radio signal.

16. A terminal device according to any preceding clause, wherein the second radio signal is received from the infrastructure equipment in a beamformed manner.

17. A terminal device according to any preceding clause, wherein the one of the separation time periods during which the second radio signal is received occurs after a predetermined number of previous ones of the separation time periods during each of which the second radio signal is not transmitted.

18. A terminal device according to any preceding clause, wherein:
the indicator of the second radio signal indicates that transmission of the first radio signal to the infrastructure equipment is to be terminated after a predetermined number of further transmissions of the first radio signal; and
the controller is configured to control the transmitter to terminate transmission of the first radio signal to the infrastructure equipment after the predetermined number of further transmissions of the first radio signal have been completed.

19. A terminal device according to any preceding clause, wherein, in response to the controller determining that the receiver has received a second radio signal comprising an indicator indicating that transmission of the first radio signal to the infrastructure equipment should be terminated, the controller is configured:
to determine whether the receiver receives a subsequent radio signal comprising a further indicator indicating that transmission of the first radio signal to the infrastructure equipment should be terminated; and
if it is determined that a subsequent radio signal comprising a further indicator indicating that transmission of the first radio signal to the infrastructure equipment should be terminated is received, to control the transmitter to terminate transmission of the first radio signal to the infrastructure equipment, and
if it is determined that a subsequent radio signal comprising a further indicator indicating that transmission of the first radio signal to the infrastructure equipment should be terminated is not received, to control the transmitter to continue transmission of the first radio signal to the infrastructure equipment.

20. Infrastructure equipment for use in a wireless telecommunications system, the infrastructure equipment comprising:
a receiver configured to repeatedly receive a first radio signal from a terminal device of the wireless telecommunications system, the first radio signal being repeatedly transmitted by the terminal device a predetermined number of times during each of a plurality of consecutive time periods, each of the plurality of consecutive time periods being separated by a separation time period;
a controller configured to determine whether information comprised within the first radio signal has been successfully obtained; and
a transmitter configured to transmit to the terminal device, in response to the information comprised within the first radio signal being determined to have been successfully obtained and during one of the separation time periods, a second radio signal, the second radio signal comprising an indicator indicating transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment.

21. Infrastructure equipment according to clause 20, wherein, in response to the information comprised within the first radio signal not being determined to have been successfully obtained and during one of the separation time periods, the transmitter is configured to transmit the second radio signal to the terminal device, the second radio signal comprising an indicator indicating that transmission of the first radio signal to the infrastructure equipment should continue and the second radio signal having a measurable characteristic on the basis of which the terminal device is operable to reduce an offset of a reference radio frequency of the terminal device relative to a transmission radio frequency of the infrastructure equipment.

22. Infrastructure equipment according to clause 21, wherein:
the indicator of the second radio signal comprises one of a first data sequence indicating that transmission of the first radio signal should continue and a second data sequence indicating that transmission of the second radio signal should be terminated.

23. Infrastructure equipment according to clause 22, wherein the terminal device is configured to determine a metric for each of the first and second data sequences, the metric indicating an extent of correlation of the one of the first and second data sequences comprised within the second radio signal with each of first and second data sequences information indicative of which is stored in a storage medium of the terminal device, and to determine the one of the first and second data sequences comprised within the second radio signal and an offset of the reference radio frequency of the terminal device relative to the transmission radio frequency of the infrastructure equipment based on the metric indicating the greatest extent of correlation.

24. Infrastructure equipment according to clause 22 or 23, wherein:
the one of the first and second data sequences is one of a plurality of predetermined data sequences; and
the transmitter is configured to transmit control information to the terminal device indicating the one of the plurality of predetermined data sequences that is to be used as the one of the first and second data sequences.

25. Infrastructure equipment according to clause 24, wherein the control information is downlink control information (DCI) allocating radio resources for a physical uplink shared channel (PUSCH).

26. Infrastructure equipment according to clause 24, wherein the control information is comprised within radio resource control (RRC) signalling.

27. Infrastructure equipment according to clause 20, wherein the indicator of the second radio signal comprises one of a first bit value indicating that transmission of the first radio signal to the infrastructure equipment should continue and a second bit value indicating that transmission of the first radio signal to the infrastructure equipment should be terminated.

28. Infrastructure equipment according to any one of clauses 20 to 27, wherein:
the transmitter is configured to transmit control information to the terminal device, the control information indicating a portion of the second radio signal within which the indicator of the second radio signal is located; and the controller is configured to control the transmitter to locate the indicator at the portion of the second radio signal indicated by the control information.

29. Infrastructure equipment according to clause 28, wherein:
the control information is downlink control information (DCI) allocating radio resources for a physical uplink shared channel (PUSCH); and
the indicator of the second radio signal is comprised within further downlink control information (DCI).

30. Infrastructure equipment according to clause 28, wherein:
the control information is comprised within radio resource control (RRC) signalling; and
the indicator of the second radio signal is comprised within downlink control information (DCI).

31. Infrastructure equipment according to any one of clauses 20 to 30, wherein the second radio signal is transmitted using radio resources in a frequency band used for transmitting a synchronisation signal to the terminal device.

32. Infrastructure equipment according to any one of clauses 20 to 31, wherein:
the second radio signal is transmitted over a time period starting at a first time;
a portion of the second radio signal comprising the indicator is transmitted over a time period starting at a second time, the second time being later than the first time; and
a portion of the second radio signal transmitted over the time period defined between the first time and the second time comprises the measurable characteristic on the basis of which the terminal device is operable to reduce an offset of the reference radio frequency of the terminal device relative to the transmission radio frequency of the infrastructure equipment.

33. Infrastructure equipment according to clause 32, wherein:
the measurable characteristic of the second radio signal is measurable by each of a plurality of terminal devices; and
the indicator of the second radio signal is associated with a single terminal device only.

34. Infrastructure equipment according to clause 33, wherein:
the portion of the second radio signal transmitted over the time period defined between the first time and the second time comprises a common data sequence associated with the plurality of terminal devices, the measurable characteristic being measurable based on the common data sequence; and
the portion of the second radio signal transmitted after the second time comprises a specific data sequence associated with the single terminal device only.

35. Infrastructure equipment according to any one of clauses 20 to 34, wherein:
the second radio signal comprises a first portion transmitted over a time period defined between a first time and a second, later, time, a second portion defined between the second time and a third, later, time and a third portion defined between the third time and a fourth, later, time;
each of the first and third portions of the second radio signal comprises the measurable characteristic on the basis of which the terminal device is operable to reduce an offset of the reference radio frequency of the terminal device relative to the transmission radio frequency of the infrastructure equipment; and the second portion comprises the indicator of the second radio signal.

36. Infrastructure equipment according to any one of clauses 20 to 35, wherein the second radio signal is transmitted to the terminal device in a beamformed manner.

37. Infrastructure equipment according to any one of clauses 20 to 36, wherein the one of the separation time periods during which the second radio signal is transmitted occurs after a predetermined number of previous ones of the separation time periods during each of which the second radio signal is not transmitted.

38. Infrastructure equipment according to any one of clauses 20 to 37, wherein the indicator of the second radio signal indicates that transmission of the first radio signal to the infrastructure equipment is to be terminated after a predetermined number of further transmissions of the first radio signal, the terminal device being configured to terminate transmission of the first radio signal to the infrastructure equipment after the predetermined number of further transmissions of the first radio signal have been completed.

39. Infrastructure equipment according to any one of clauses 20 to 38, wherein the transmitter is configured, at a time after a transmission of a second radio signal comprising an indicator indicating that transmission of the first radio signal to the infrastructure equipment should be terminated, to transmit to the terminal device a subsequent radio signal comprising a further indicator indicating that transmission of the first radio signal to the infrastructure equipment should be terminated.

40. Infrastructure equipment according to clause 39, wherein, in response to the controller determining that the receiver is no longer receiving expected repetitions of the first radio signal and that the transmitter has not transmitted a second radio signal comprising an indicator indicating that transmission of the first radio signal to the infrastructure equipment should be terminated, the transmitter is configured to transmit to the terminal device a further radio signal comprising an indicator indicating that transmission of the first radio signal to the infrastructure equipment should continue.

41. A method of operating terminal device for use in a wireless telecommunications system, the method comprising:
controlling a transmitter of the terminal device to transmit a first radio signal to infrastructure equipment of the wireless telecommunications system, the first radio signal being repeatedly transmitted a predetermined number of times during each of a plurality of consecutive time periods, each of the plurality of consecutive time periods being separated by a separation time period;
controlling a receiver of the terminal device to receive, from the infrastructure equipment and during one of the separation time periods, a second radio signal, the second radio signal comprising an indicator indicating that transmission of the first radio signal to the infrastructure equipment should continue or that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment; and
on the basis of the received second radio signal, controlling the transmitter of the terminal device to continue or to terminate transmission of the first radio signal and to reduce an offset of the reference radio frequency of the terminal device relative to the transmission radio frequency of the infrastructure equipment.

42. A method of operating infrastructure equipment for use in a wireless telecommunications system, the method comprising:
controlling a receiver of the infrastructure equipment to repeatedly receive a first radio signal from a terminal device of the wireless telecommunications system, the first radio signal being repeatedly transmitted by the terminal device a predetermined number of times during each of a plurality of consecutive time periods, each of the plurality of consecutive time periods being separated by a separation time period;
determining whether information comprised within the first radio signal has been successfully obtained; and
controlling a transmitter of the infrastructure equipment to transmit to the terminal device, in response to the information comprised within the first radio signal being determined to have been successfully obtained and during one of the separation time periods, a second radio signal, the second radio signal comprising an indicator indicating that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment.

43. A wireless telecommunications system comprising a terminal device according to clause 1 and infrastructure equipment according to clause 20.

44. Circuitry for a terminal device for use in a wireless telecommunications system, wherein the circuitry comprises controller circuitry, transmitter circuitry and receiver circuitry, the controller circuitry being configured:
to control the transmitter circuitry to transmit a first radio signal to infrastructure equipment of the wireless telecommunications system, the first radio signal being repeatedly transmitted a predetermined number of times during each of a plurality of consecutive time periods, each of the plurality of consecutive time periods being separated by a separation time period;
to control the receiver circuitry to receive, from the infrastructure equipment and during one of the separation time periods, a second radio signal, the second radio signal comprising an indicator indicating that transmission of the first radio signal to the infrastructure equipment should continue or that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment; and
on the basis of the received second radio signal, to control the transmitter circuitry to continue or to terminate transmission of the first radio signal and to reduce an offset of the reference radio frequency of the terminal device relative to the transmission radio frequency of the infrastructure equipment.

45. Circuitry for infrastructure equipment for use in a wireless telecommunications system, wherein the circuitry comprises controller circuitry, transmitter circuitry and receiver circuitry, wherein the controller circuitry is configured:
to control the receiver circuitry to repeatedly receive a first radio signal from a terminal device of the wireless telecommunications system, the first radio signal being repeatedly transmitted by the terminal device a predetermined number of times during each of a plurality of consecutive time periods, each of the plurality of consecutive time periods being separated by a separation time period;
to determine whether information comprised within the first radio signal has been successfully obtained; and
to control the transmitter circuitry to transmit to the terminal device, in response to the information comprised within the first radio signal being determined to have been successfully obtained and during one of the separation time periods, a second radio signal, the second radio signal comprising an indicator indicating that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment.

Various further aspects and features of the present disclosure are defined in the appended claims and various combinations of the features of the dependent claims may be made with those of the independent claims other than the specific combinations recited for the claim dependency. Modifications may also be made to the embodiments hereinbefore described without departing from the scope of the present disclosure. For instance, although a feature may appear to be described in connection with particular embodiments, one skilled in the art would recognise that various features of the described embodiments may be combined in accordance with the disclosure.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink communications channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an base station to UEs being served by the base station. For example, a number of resource blocks of the PDSCH may be allocated to a UE in order that it may receive data that it has previously requested or data which is being pushed to it by the base station, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the base station for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the base station. Further information on the structure and functioning of the physical channels of LTE systems can be found in [1].

In an analogous manner to the resources of the PDSCH, resources of the PUSCH are required to be scheduled or granted by the serving base station and thus if data is to be transmitted by a UE, resources of the PUSCH are required to be granted to the UE by the base station. At a UE, PUSCH resource allocation is achieved by the transmission of a scheduling request or a buffer status report to its serving base station. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the base station is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the base station and gives the base station information regarding the amount of data in an uplink buffer or buffers at the UE. After receiving the buffer status report, the base station can allocate a portion of the PUSCH resources to the sending UE in order to transmit some of its buffered uplink data and then inform the UE of the resource allocation via a DCI in the PDCCH. For example, presuming a UE has a connection with the base station, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

REFERENCES

[1] LTE for UMTS: OFDMA and SC-FDMA Based Radio Access, Harris Holma and Antti Toskala, Wiley 2009, ISBN 978-0-470-99401-6.
[2] RP-161464, "Revised WID for Further Enhanced MTC for LTE," Ericsson, RAN #73
[3] RP-161901, "Revised work item proposal: Enhancements of NB-IoT", Huawei, HiSilicon, RAN #73
[4] R1-153338, "Discussion on UE Power Consumption Reduction Techniques," MediaTek, RAN1 #81
[5] PS160043, "Frequency error estimation during split repetitive uplink message transmission"

The invention claimed is:

1. A terminal device for use in a wireless telecommunications system, the terminal device comprising:
a transmitter configured to transmit a first radio signal to infrastructure equipment of the wireless telecommunications system, the first radio signal being repeatedly transmitted a predetermined number of times during each of a plurality of consecutive time periods, each of the plurality of consecutive time periods being separated by a separation time period;
a receiver configured to receive, from the infrastructure equipment and during one of the separation time periods, a second radio signal, the second radio signal comprising an indicator indicating that transmission of the first radio signal to the infrastructure equipment should continue or that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment, the receiver is configured to receive control information from the infrastructure equipment, the control information indicating a portion of the second radio signal within which the indicator of the second radio signal is located; and
a controller configured, on the basis of the received second radio signal, to control the transmitter to continue or to terminate transmission of the first radio signal and to reduce an offset of the reference radio frequency of the terminal device relative to the transmission radio frequency of the infrastructure equipment, the controller is configured to obtain the indicator from the portion of the second radio signal indicated by the control information.

2. A terminal device according to claim 1, wherein:
the indicator of the second radio signal comprises one of a first data sequence indicating that transmission of the first radio signal should continue and a second data sequence indicating that transmission of the second radio signal should be terminated.

3. A terminal device according to claim 2, comprising a storage medium configured to store information indicative of each of the first and second data sequences, wherein the controller is configured:
to determine a metric for each of the first and second data sequences, the metric indicating an extent of correlation of the one of the first and second data sequences comprised within the second radio signal with each of the first and second data sequences information indicative of which is stored, and
to determine the one of the first and second data sequences comprised within the second radio signal and an offset of the reference radio frequency of the terminal device relative to the transmission radio frequency of the infrastructure equipment based on the metric indicating the greatest extent of correlation.

4. A terminal device according to claim 2, wherein:
the one of the first and second data sequences is one of a plurality of predetermined data sequences; and
the receiver is configured to receive control information from the infrastructure equipment indicating the one of the plurality of predetermined data sequences that is to be used as the one of the first and second data sequences.

5. A terminal device according to claim 4, wherein the control information is downlink control information (DCI) allocating radio resources for a physical uplink shared channel (PUSCH).

6. A terminal device according to claim 4, wherein the control information is comprised within radio resource control (RRC) signalling.

7. A terminal device according to claim 1, wherein the indicator of the second radio signal comprises one of a first bit value indicating that transmission of the first radio signal to the infrastructure equipment should continue and a second bit value indicating that transmission of the first radio signal to the infrastructure equipment should be terminated.

8. A terminal device according to claim 1, wherein:
the receiver is configured to receive control information from the infrastructure equipment, the control information indicating a portion of the second radio signal within which the indicator of the second radio signal is located; and
the controller is configured to obtain the indicator from the portion of the second radio signal indicated by the control information.

9. A terminal device according to claim 8, wherein:
the control information is downlink control information (DCI) allocating radio resources for a physical uplink shared channel (PUSCH); and
the indicator of the second radio signal is comprised within further downlink control information (DCI).

10. A terminal device according to claim 8, wherein:
the control information is comprised within radio resource control (RRC) signalling; and
the indicator of the second radio signal is comprised within downlink control information (DCI).

11. A terminal device according to claim 1, wherein the second radio signal is transmitted using radio resources in a frequency band used for transmitting a synchronisation signal to the terminal device.

12. A terminal device according to claim 1, wherein:
the second radio signal is transmitted over a time period starting at a first time;
a portion of the second radio signal comprising the indicator is transmitted over a time period starting at a second time, the second time being later than the first time; and
a portion of the second radio signal transmitted over the time period defined between the first time and the second time comprises the measurable characteristic on the basis of which the terminal device is operable to reduce an offset of the reference radio frequency of the terminal device relative to the transmission radio frequency of the infrastructure equipment.

13. A terminal device according to claim 12, wherein:
the measurable characteristic of the second radio signal is measurable by each of a plurality of terminal devices; and
the indicator of the second radio signal is associated with the terminal device only.

14. A terminal device according to claim 13, wherein:
the portion of the second radio signal transmitted over the time period defined between the first time and the second time comprises a common data sequence associated with the plurality of terminal devices, the measurable characteristic being measurable based on the common data sequence; and
the portion of the second radio signal transmitted after the second time comprises a specific data sequence associated with the terminal device only.

15. A terminal device according to claim 1, wherein:
the second radio signal comprises a first portion transmitted over a time period defined between a first time and a second, later, time, a second portion defined between the second time and a third, later, time and a third portion defined between the third time and a fourth, later, time;
each of the first and third portions of the second radio signal comprises the measurable characteristic on the basis of which the terminal device is operable to reduce an offset of the reference radio frequency of the terminal device relative to the transmission radio frequency of the infrastructure equipment; and
the second portion comprises the indicator of the second radio signal.

16. A terminal device according to claim 1, wherein the second radio signal is received from the infrastructure equipment in a beamformed manner.

17. A terminal device according to claim 1, wherein the one of the separation time periods during which the second radio signal is received occurs after a predetermined number of previous ones of the separation time periods during each of which the second radio signal is not transmitted.

18. A terminal device according to claim 1, wherein:
the indicator of the second radio signal indicates that transmission of the first radio signal to the infrastructure equipment is to be terminated after a predetermined number of further transmissions of the first radio signal; and the controller is configured to control the transmitter to terminate transmission of the first radio signal to the infrastructure equipment after the predetermined number of further transmissions of the first radio signal have been completed.

19. A terminal device according to claim 1, wherein, in response to the controller determining that the receiver has received a second radio signal comprising an indicator indicating that transmission of the first radio signal to the infrastructure equipment should be terminated, the controller is configured:
to determine whether the receiver receives a subsequent radio signal comprising a further indicator indicating that transmission of the first radio signal to the infrastructure equipment should be terminated; and
if it is determined that a subsequent radio signal comprising a further indicator indicating that transmission of the first radio signal to the infrastructure equipment should be terminated is received, to control the transmitter to terminate transmission of the first radio signal to the infrastructure equipment, and
if it is determined that a subsequent radio signal comprising a further indicator indicating that transmission of the first radio signal to the infrastructure equipment should be terminated is not received, to control the transmitter to continue transmission of the first radio signal to the infrastructure equipment.

20. Infrastructure equipment for use in a wireless telecommunications system, the infrastructure equipment comprising:
a receiver configured to repeatedly receive a first radio signal from a terminal device of the wireless telecommunications system, the first radio signal being repeatedly transmitted by the terminal device a predetermined number of times during each of a plurality of consecutive time periods, each of the plurality of consecutive time periods being separated by a separation time period;
a controller configured to determine whether information comprised within the first radio signal has been successfully obtained; and
a transmitter configured to transmit to the terminal device, in response to the information comprised within the first radio signal being determined to have been successfully obtained and during one of the separation time periods, a second radio signal, the second radio signal comprising an indicator indicating transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment,
the second radio signal comprises a first portion transmitted over a time period defined between a first time and a second, later, time, a second portion defined between the second time and a third, later, time and a third portion defined between the third time and a fourth, later, time;
each of the first and third portions of the second radio signal comprises the measurable characteristic on the basis of which the terminal device is operable to reduce an offset of the reference radio frequency of the terminal device relative to the transmission radio frequency of the infrastructure equipment; and
the second portion comprises the indicator of the second radio signal.

21. A method of operating terminal device for use in a wireless telecommunications system, the method comprising:
controlling a transmitter of the terminal device to transmit a first radio signal to infrastructure equipment of the wireless telecommunications system, the first radio signal being repeatedly transmitted a predetermined number of times during each of a plurality of consecutive time periods, each of the plurality of consecutive time periods being separated by a separation time period;
controlling a receiver of the terminal device to receive, from the infrastructure equipment and during one of the separation time periods, a second radio signal, the second radio signal comprising an indicator indicating that transmission of the first radio signal to the infrastructure equipment should continue or that transmission of the first radio signal to the infrastructure equipment should be terminated and the second radio signal having a measurable characteristic on the basis of which the terminal device is operable to reduce an offset of a reference radio frequency of the terminal device relative to a transmission radio frequency of the infrastructure equipment, the receiver is configured to receive control information from the infrastructure equipment, the control information indicating a portion of the second radio signal within which the indicator of the second radio signal is located; and
on the basis of the received second radio signal, controlling the transmitter of the terminal device to continue or to terminate transmission of the first radio signal and to reduce an offset of the reference radio frequency of the terminal device relative to the transmission radio frequency of the infrastructure equipment, wherein the controlling of the transmitter comprises obtaining the indicator from the portion of the second radio signal indicated by the control information.

* * * * *